United States Patent
Castillo et al.

(10) Patent No.: US 12,472,712 B2
(45) Date of Patent: Nov. 18, 2025

(54) FABRICATION OF VARIABLE TRANSMISSION DEVICES USING PRINTED INTERLAYERS

(71) Applicant: Polyceed Inc., Tucson, AZ (US)

(72) Inventors: Susana J. Castillo, Tucson, AZ (US);
Anoop Agrawal, Tucson, AZ (US);
Jason Kyle Smith, Orange, CA (US);
John P. Cronin, Tucson, AZ (US)

(73) Assignee: Polyceed Inc., Tucson, AZ (US)

( * ) Notice: Subject to any disclaimer, the term of this patent is extended or adjusted under 35 U.S.C. 154(b) by 0 days.

(21) Appl. No.: 19/081,483

(22) Filed: Mar. 17, 2025

(65) Prior Publication Data

US 2025/0205984 A1    Jun. 26, 2025

Related U.S. Application Data

(63) Continuation-in-part of application No. 17/782,289, filed as application No. PCT/US2020/029057 on Apr. 21, 2020, now Pat. No. 12,251,898.

(60) Provisional application No. 62/944,085, filed on Dec. 5, 2019.

(51) Int. Cl.
| | |
|---|---|
| *B33Y 80/00* | (2015.01) |
| *B29D 11/00* | (2006.01) |
| *B32B 17/10* | (2006.01) |
| *B29K 75/00* | (2006.01) |

(52) U.S. Cl.
CPC .... *B29D 11/0073* (2013.01); *B32B 17/10036* (2013.01); *B32B 17/10513* (2013.01); *B32B 17/10568* (2013.01); *B32B 17/1077* (2013.01); *B33Y 80/00* (2014.12); *B29K 2075/00* (2013.01); *B29K 2995/0003* (2013.01); *B29K 2995/0018* (2013.01)

(58) Field of Classification Search
CPC .... B29K 2995/0018; B29K 2995/0003; B29K 2075/00; B32B 17/1077; B32B 17/10568; B32B 17/10513; B32B 17/10036; B33Y 80/00; B29D 11/0073
See application file for complete search history.

(56) References Cited

U.S. PATENT DOCUMENTS

| | | | | |
|---|---|---|---|---|
| 5,244,557 | A | * 9/1993 | Defendini | ......... B32B 17/10045 427/126.3 |
| 2008/0310007 | A1 | 12/2008 | Agrawal et al. | |

(Continued)

OTHER PUBLICATIONS

Notification of Transmittal of the International Search Report and The Written Opinion issued in PCT/US2020/029057 dated Jul. 1, 2020, 21 pages.

(Continued)

*Primary Examiner* — Vishal I Patel
(74) *Attorney, Agent, or Firm* — Rothwell, Figg, Ernst & Manbeck, P.C.

(57) ABSTRACT

Methods and materials to fabricate laminated variable transmission devices are disclosed, particularly the laminates of electrochromic devices where the electrolytic interlayer is deposited by 3d printing (or also called additive manufacturing process). Printing may be used to form both an interlayer and a sealant located at the perimeter of the interlayer. A lamination process to form the EC device combines the assembly of a protective film using a third substrate is also disclosed.

8 Claims, 13 Drawing Sheets

(56) References Cited

U.S. PATENT DOCUMENTS

2016/0297935 A1 10/2016 Arevo et al.
2017/0291364 A1 10/2017 Womer

OTHER PUBLICATIONS

Tanaka, R et al. Lithium ion conductivity in polyoxyethylene/polyethylenimine blends. Electrochimica Acta. Mar. 15, 2001. vol. 46(10-11). DOI: 10.1016/S0013-4686(00)00775-1 abstract.
International Preliminary Report on Patentability cited in PCT/US2020/029057, dated May 17, 2022, 11 pages.

* cited by examiner

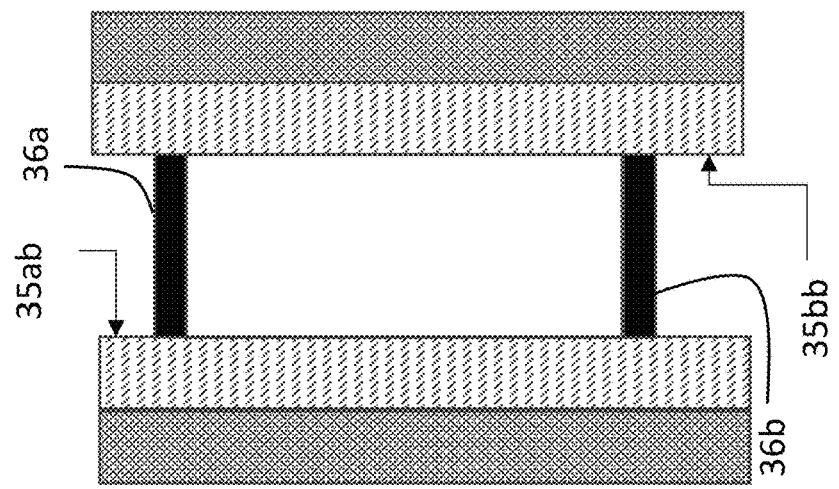
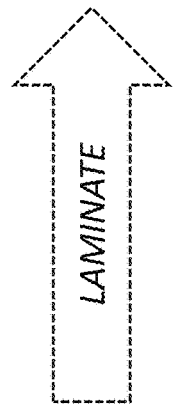
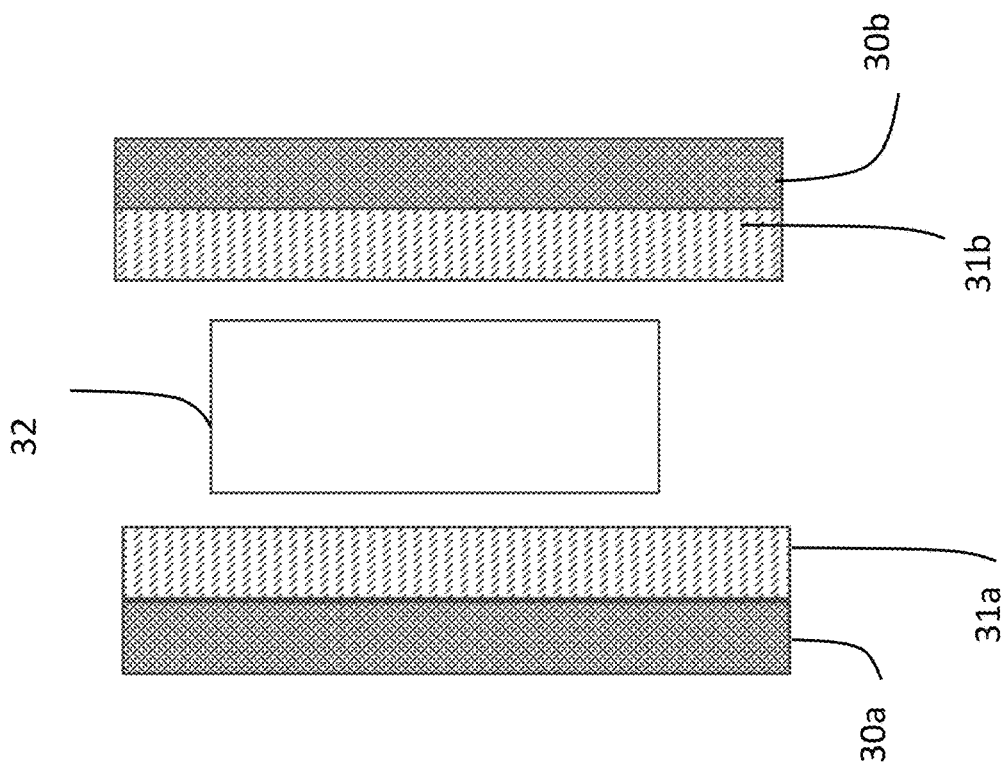
FIGURE 3

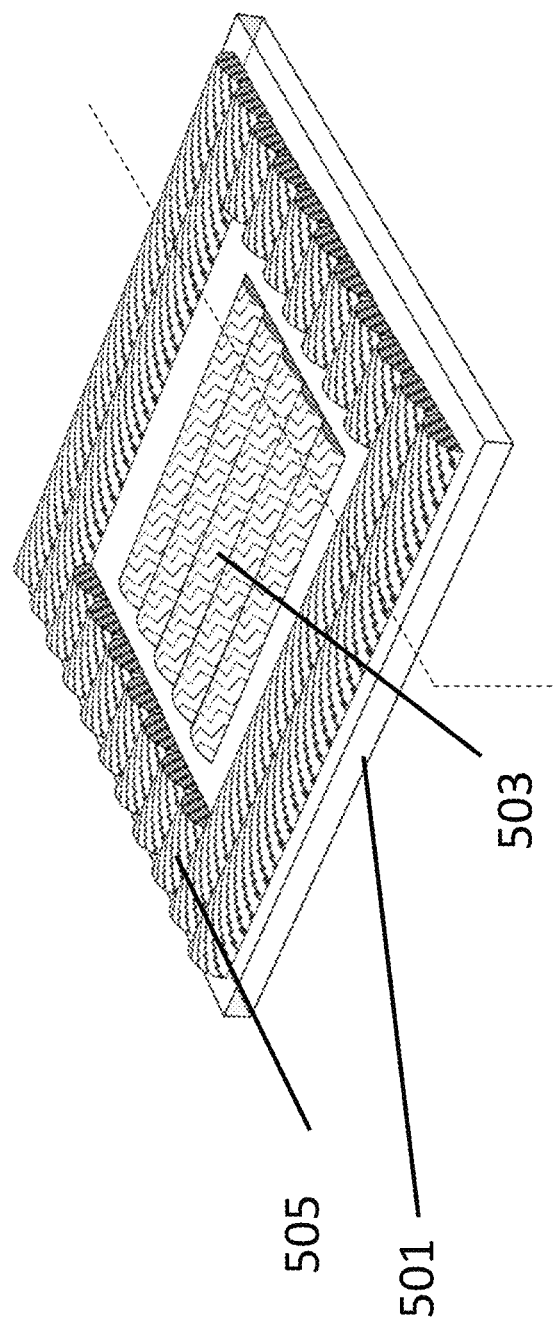
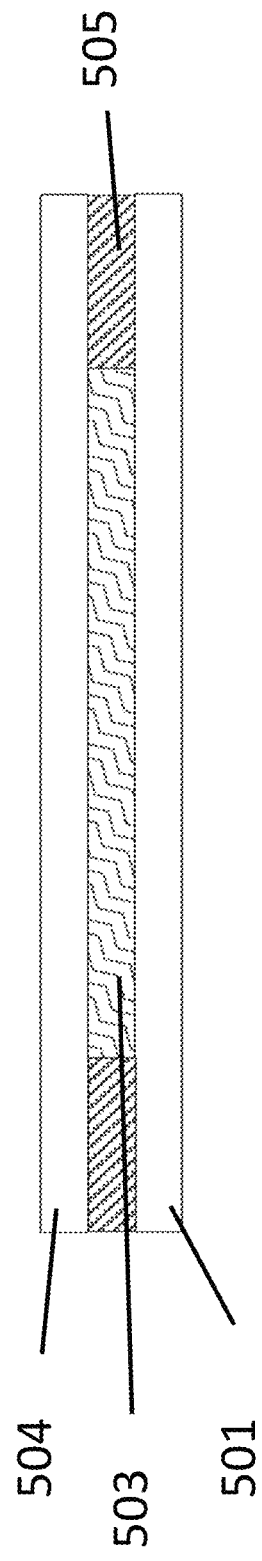
Figure 5a
Figure 5b

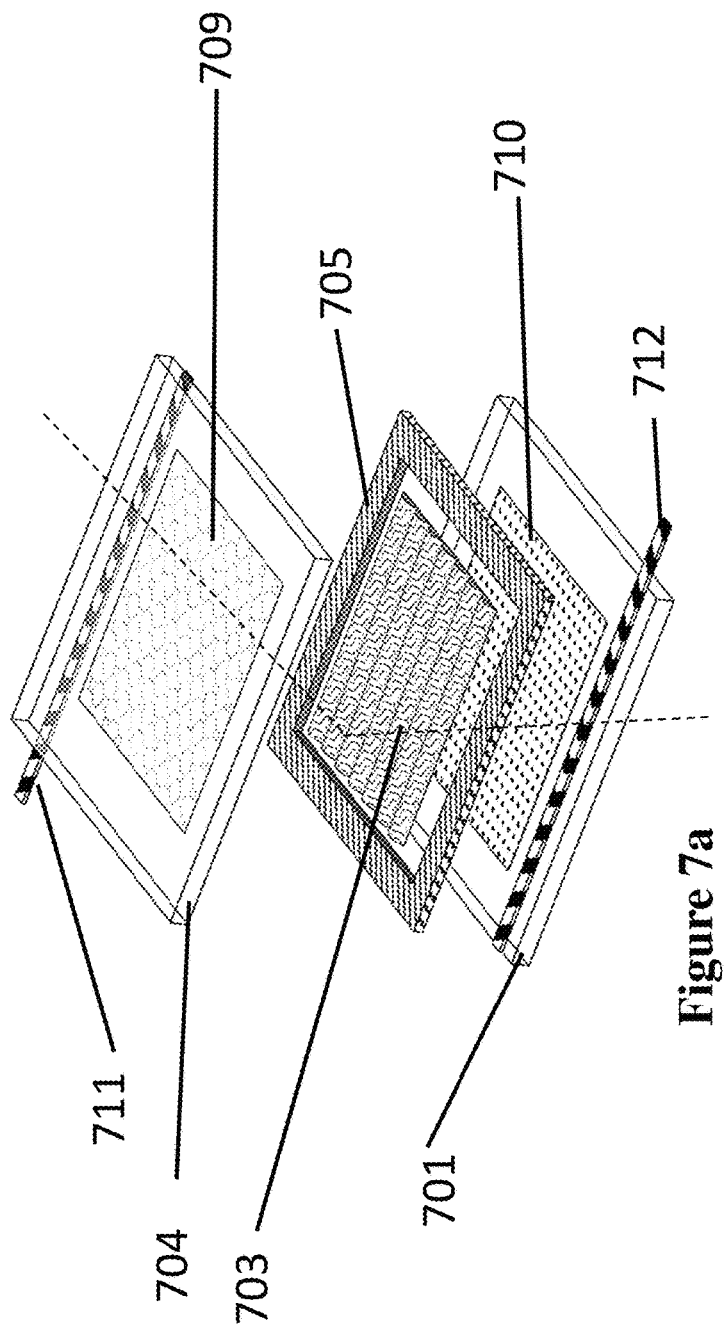
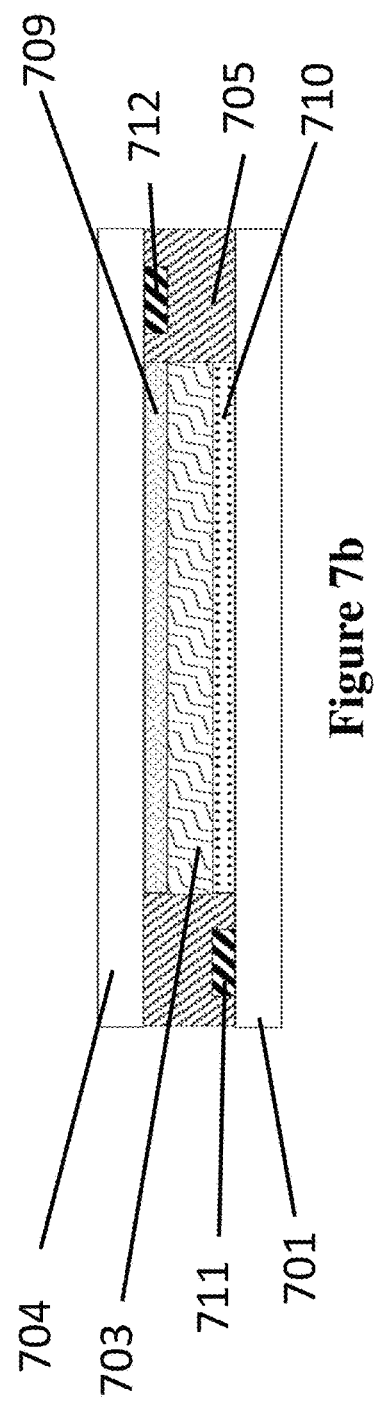
Figure 7a
Figure 7b

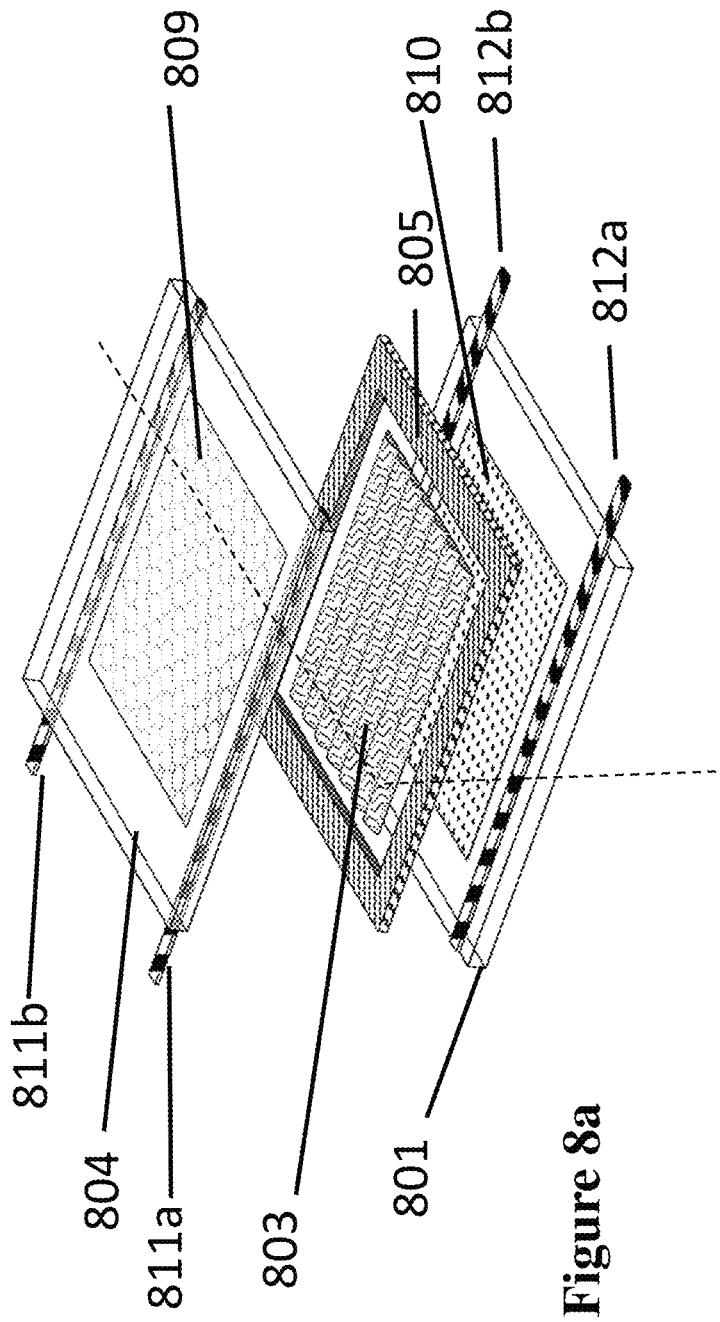
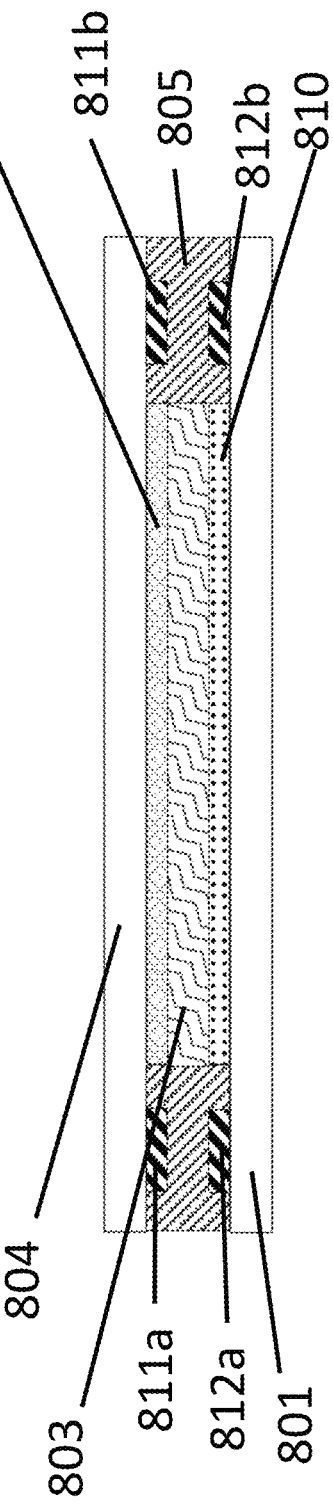
Figure 8a
Figure 8b

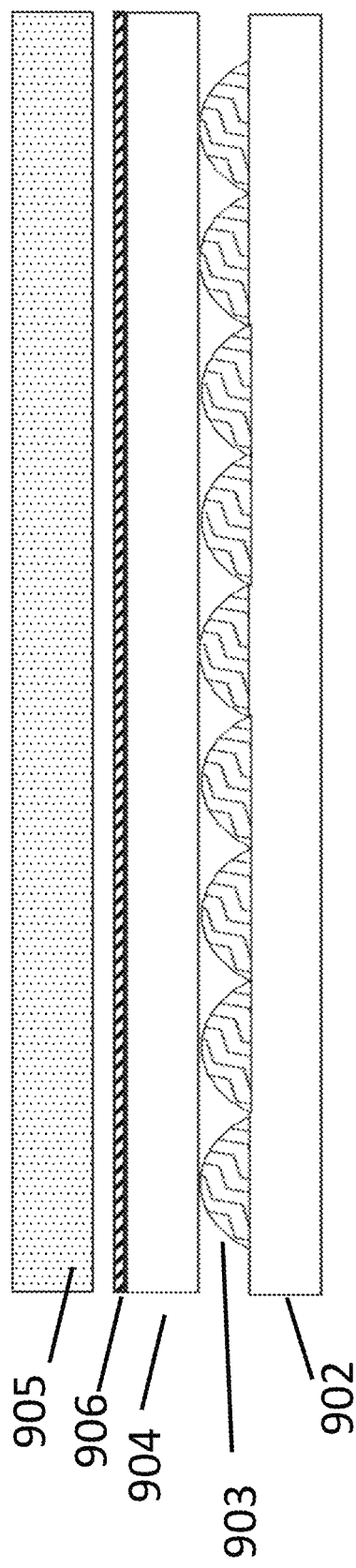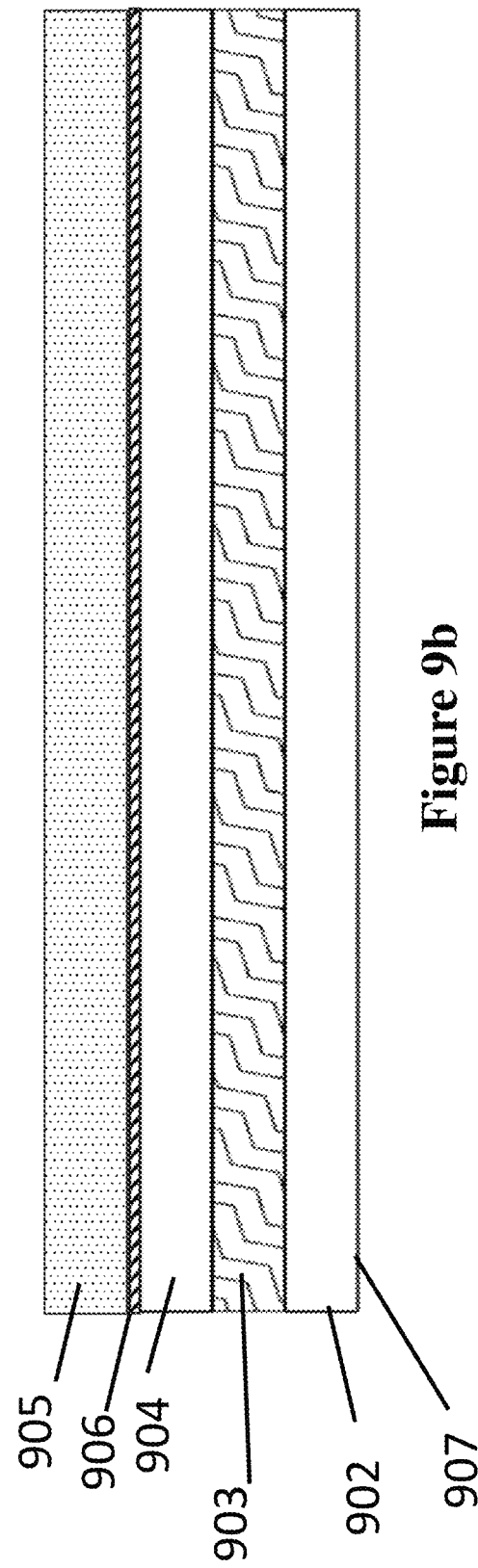

FABRICATION OF VARIABLE TRANSMISSION DEVICES USING PRINTED INTERLAYERS

CROSS-REFERENCE TO RELATED APPLICATIONS

This application is a Continuation-in-Part of U.S. patent application Ser. No. 17/782,289, filed Jun. 3, 2022, which is a National Stage of International Patent Application No. PCT/US2020/029057, filed Apr. 21, 2020, which claims benefit of U.S. Provisional Application No. 62/944,085, filed Dec. 5, 2019, the disclosures of which are incorporated herein in their entirety by reference, and priority is claimed to each of the foregoing.

FIELD OF THE INVENTION

The present invention relates to processing of laminates formed by sandwiching a polymeric interlayer between substrates. The substrates include glass and plastics. This method includes fabrication of laminated variable light transmission devices (including electrochromic, thermochromic and liquid crystal devices) that require an interlayer with active optical or electrochemical properties. The invention discloses methods to deposit polymeric interlayer compositions using printing, particularly 3d printing or also called additive manufacturing method using one of the substrates as a print bed and then using a second substrate to sandwich the deposited layer and then to form the laminate under heat and pressure.

BACKGROUND OF INVENTION

The invention may be used to produce laminates for use in windows of buildings and transportation (automobiles, buses, trains, planes, boats) including bullet-proof glass for armored vehicles; windshields for vehicles, canopies for military aircraft, automotive mirrors, etc. The variable light transmission devices made by this method include electrochromic, thermochromic and liquid crystal devices. In some other respects, the teachings of this disclosure may also be used for other laminated electrochemical devices such as batteries (including secondary batteries) and actuators.

In one aspect, the present disclosure teaches deposition of thermoplastic polymeric composition on a substrate by 3d printing and then sandwiching this composition by using another substrate and then laminating it by subjecting the assembly to vacuum (or reduced pressure) to remove any trapped air or gas bubbles and then applying heat and pressure to melt and flow the thermoplastic composition and form the laminates. In another aspect, this sandwiched thermoplastic composition forms a layer (or an interlayer) that is contiguous after the lamination process. Variable light transmission devices which are used in buildings and transportation windows are also called "smart glass" or "smart windows" where the light transmission or reflection characteristics of a window are changed by electronic switching. The invention will be principally illustrated as it applies to produce variable light transmission devices (electrochromic (EC) devices and liquid crystal (LC) devices). The variable transmission devices including these and the thermochromic devices will be collectively called variable transmission (VT) devices.

Although, 3d printing or additive manufacturing is typically used to form parts which are three dimensional and formed by deposition of layer by layer of printed material where the previous layer acts as a bed for the next layer until the three-dimensional part is formed. In this case, this term is loosely used to form interlayers in a laminate where the thickness is important and may be deposited by single layer (i.e., a single pass) or as multiple layers (using multiple passes). In addition, in some of the structures several layers with different compositions are used where one composition may be thin and printed by any known printing method but acts as a printing-bed for the next layer (i.e., is additive in nature). Further, some of the laminates envisaged in this innovation require printing different material compositions in different regions of the substrate, which are then combined into a single laminate. Thus, printing in this innovation uses 3d printing principles to form the interlayer and some other components. In one embodiment the thickness of each deposited layer by 3d printing is formed by depositing a continuous molten material (also called a bead) on a first substrate which is at least 100 µm in width or diameter, in another embodiment this dimension is at least 150 µm, in yet another embodiment this is at least 200 µm and in a further embodiment this is at least 300 µm and in another embodiment this may exceed 1 mm. In another embodiment the 3d printing involves deposition of a bead on first substrate where several continuous lines or any other pattern is formed by depositing the material bead. These beads and/or lines of material are laminated by lowering a second substrate and using heat and pressure to make these to flow so as to coalesce to form a layer of uniform thickness of the interlayer between these substrates. This is discussed extensively later and may also involve application of vacuum or reduced pressure treatment to remove any trapped gasses so that the laminates are bubble free. For laminates for use in optical applications, these laminates are optically clear with low optical haze. Even when tinted substrates or a tinted polymeric interlayer is used, the low haze is important. Quality of lamination is generally established by looking at the haze value which determines the clarity of transmission by laminating a clear polymeric material between two and clear substrates. For determination of lamination quality, it is preferred that both the polymer and the substrate are not tinted. For example, clear and non-tinted substrates are those which do not have noticeable visible tint and haze and have visible light transmission of greater than 85%. Light transmission may be measured by any convenient method such as an integrated transmission at all wavelengths in the visible range (400 to 780 nm), or the light transmission using a photopic filter or may be measured at 550 nm which is close to the peak of the photopic response (all measurements being performed when the incoming light is at normal incidence to the substrate). For example, standard non-tinted soda-lime glass substrates in a thickness of about 6 mm or lower and containing standard amount of iron (usually about 0.15% or lower), have optical haze of less than 0.5% and transmission in a range of 89 to 92%. For good lamination a desirable haze of the laminate made using clear and non-tinted substrates (as defined above) should be less than 5% and in another embodiment less than 2%; and the optical transmission using clear (non-tinted) interlayers greater than 85% in one embodiment and greater than 82% in another embodiment. Such laminates are called haze-free laminates with high optical transmission. The minimum haze of the laminate is usually the same or higher than the substrate haze. In some cases, the substrate haze is caused by surface roughness on the substrate which is filled in by the laminating interlayer and the haze value of the laminate may be lowered as compared to the substrate.

Thus in one embodiment 3d printing means that at least 5 lines of material are deposited adjacent to each other on a substrate within a width of 1 cm, in another embodiment at least 10 lines, in another embodiment at least 20 lines of material are deposited, in a further embodiment at least 50 lines are deposited and in a further embodiment at least 100 lines are deposited all in a width of 1 cm. In each of these as an option, additional lines may be formed on top of already deposited lines. As mentioned earlier it is important that later these lines coalesce to form a uniform layer when laminated. In some cases, although a bubble free laminate is formed, however, if the layers or a set of layers have different compositions, then lamination conditions may be used where compositional identity of the layers is maintained and there may be some intermixing or adhesion at the interfaces where the composition changes.

In the devices of the present invention, the polymeric interlayer laminated between the two substrates is not fabricated using a pre-formed thermoplastic polymeric sheet, rather a thermoplastic polymeric composition which is deposited on one of the substrates from the melt and then a second substrate is lowered to sandwich this composition and the assembly is laminated under heat and pressure, so that after lamination a polymeric layer (interlayer) melts and flows resulting in uniform thickness of this material which is sandwiched and produces a bonded laminate assembly with the two substrates. The deposited layer may comprise of a pattern deposited in a single pass by an additive printing head or several layers may be formed by several passes of the printing head. The single pass may also be termed as 2D printing, which is considered a subset of 3D printing for this disclosure. The layers of these polymeric compositions may be deposited in a specific pattern and/or with a specific surface texture. These textures or patterns form pathways to degas or remove any air or gas pockets by applying a vacuum so that bubble free laminates with uniform thickness of polymeric interlayer compositions may be produced. This method of deposition of a polymeric composition followed by lamination may be used for a variety of applications as listed earlier to produce laminated glass and other laminated structures.

The advantage of this method is to be able to use substrates of any geometrical shape and size and be able to dispense the polymeric composition for the interlayer with no waste. In addition, the process of this invention can be adapted for making laminates with non-planar substrates (e.g., including those substrates which have compound curvature, such as automotive glass). For applications where curvature is different for the two substrates for certain non-EO devices, the polymeric material may be dispensed by taking these curvatures into account so that the polymeric layer thickness is programmed to be the same or different in different sections of this assembly.

3d printing method is particularly suitable for making variable transmission devices where the thermoplastic composition for the polymer interlayer has an active component (or active interlayer) or also called an active medium. Active means that either the polymer layer has an electrochromic, ion-conductive (electrolytic), a liquid crystalline material or a thermochromic material which is instrumental in providing the change in the optical properties. Ion-conductive means that this layer has salts that dissociate into anions and cations providing the ionic conductivity. When active layers are present, maintaining the thickness uniformity is important for EO devices (including those EO devices which use curved substrates), otherwise the optical change will vary and cause the window or the device to appear non-uniform in at least one of the optical states or will show non-uniform rate of coloration while changing from one optical state to the next.

This innovation has specific cost advantages in making variable transmission devices, where the sandwiched polymer layer (i.e., the interlayer) is a high economic value material composition and has to be used conservatively for reducing the product cost. The polymeric interlayer composition in these devices serves as a polymeric electrolyte for EC devices or as a polymeric material containing liquid crystalline or a thermochromic material for other devices. 3d printing (or additive manufacturing) process is highly suitable to manufacturing where size and shape of the devices may frequently vary within a manufacturing plant or even amongst different manufacturing plants. When rolls of preformed sheets are used, then these have to be produced in different width rolls for different sized devices and still there is considerable waste in cutting films to size and shape to adjust to the substrate sizes. Most interlayer films are produced in rolls containing a release film so that they are easy to unroll and are not blocked (i.e., the layers in the roll do not stick to one another), and if the interlayers are printed then waste resulting from the use of such release films is also eliminated. Use of pre-formed interlayer films also increases inventory costs and supply chain complexity as pre-formed films may be produced by companies which do not make the thermoplastic resins. Expense also adds up in transportation of rolls of such films as they must be protected against atmospheric exposure (humidity, air, temperature extremes), and later in manufacturing as additional equipment is needed for handling, processing and cutting of such films. Once cut to size, the films must also be properly aligned/positioned on the substrate, which adds more processing difficulty if the polymeric film is tacky. Further, if this layer has to be processed under inert conditions (free of oxygen and/or moisture), then it is difficult and/or expensive to first make films under these conditions, maintain partially used pre-formed film rolls under these conditions, and then cutting and laying up of films under inert conditions, followed by lamination. This difficulty and the processing cost increase disproportionately when larger substrate sizes are used. It is far easier to adopt the printing and lamination process of this disclosure for inert condition processing.

In a related embodiment, variable transmission devices are further laminated using conventional laminating films (preformed films) and an additional third substrate to provide protection from mechanical and solar radiation damage (as these films absorb the solar UV). The windows with such laminated films are placed in a building or in a transportation window so that they are exterior facing and attenuate the UV part of the solar radiation as it passes through them, or may attenuate certain part of the spectrum to result in certain colors. These films also provide mechanical damage protection (impact resistance and safety, including hurricane protection) and may also provide acoustic attenuation depending on their composition and thickness, etc.

For 3d printing, the material composition may be supplied in bulk such as in spools, pellets and drums which are easy to maintain under inert conditions and can be easily transported. Additional cost savings are achieved by forming these polymeric compositions in drums under inert conditions, and then storing material in these drums and transporting them to the manufacturing site. During manufacturing of the laminated devices the polymeric composition may be supplied to the printing heads by melting these materials within these drums (e.g., with a hot finger or a hot plate) and then pumping them out through insulated and/or heated pipes on to the dispensing head, all of which can be much more easily achieved under inert conditions. Alternative forms of material supply include pellets which are conveyed and melted by a screw extruder; pellets which are gravity fed into the print head, spools of strands which may be drawn into the print head using a positive feed mechanism. The print head melts the polymeric composition and then positively pushes (extrudes) the material through a die of required shape and size. It must be noted that depending on the processing conditions (throughput rate and the relative speed of the print head to the substrate) and the viscoelastic characteristics of the melt, the extruded cross-section may be of a different size than the size of the die outlet. Further, the containers holding the incoming material may be cleaned and reused decreasing landfill waste.

In another embodiment, the feed may be monomeric, and this is polymerized into a thermoplastic composition prior to being deposited on the substrate (or is polymerized during or after deposition). This means that the feed material for the interlayer is in a monomeric form (monomeric feed), and is polymerized during the deposition process but still retains its thermoplastic nature, or polymerized after it is deposited and while it is heated to form the interlayer, or even after the desired interlayer is formed.

In one embodiment, this method of depositing the interlayer also allows the interlayer layer to be composed of several layers with different compositions or in another embodiment, the interlayer with different material compositions may be deposited in different regions of the substrate and then laminated together. An example of the latter are compositions with different colors which are used in a single laminate, such as in preparation of an automotive windshield wherein in a single laminate a color band is placed at the top. To achieve this different color compositions are deposited in different regions of the substrate. In another example, particularly for the EO devices a perimeter sealant is required which is a different material with very different properties. The interlayer composition is deposited in the center of a substrate, and the perimeter sealant is deposited close to the substrate edge encircling the interlayer composition. and then both are laminated at the same time by lowering a second substrate. The deposition of these materials is accomplished by either multiple print heads each associated with a different material feed (e.g., strand or extruder systems) or through a material exchange in a single print head.

In an embodiment several printing heads using different additive manufacturing technologies may be used simultaneously. Ability of the additive manufacturing system to use multiple extruders, which may be same type of extruder or different type. Examples are fused filament fabrication (fff) type extrusion head paired with a robocasting/direct ink write type extruder for extrusion of different materials, inkjet printing and digital printing.

In another embodiment, a single extruder capable exchanging material during the process may print the different color of the thermoplastic composition.

SUMMARY OF THE INVENTION

The present disclosure includes fabrication of a laminated structure, where a thermoplastic composition is laminated between two substrates, however, the thermoplastic polymeric composition is not pre-formed as a film and then placed between the two substrates prior to lamination, rather the thermoplastic material is deposited in a pattern on one of the substrates and this pattern is laminated by lowering the second substrate and sandwiching the thermoplastic composition and forming a laminate where the thermoplastic composition melts and flows to form the interlayer which is bonded to the substrates. The deposition of the thermoplastic polymeric composition is carried out using the principles of printing, particularly including methods used for 3d printing or additive manufacturing.

Another objective includes the use of these methods to form a variety of electrooptical (EO) devices by laminating active layers between substrates. These substrates may be pre-coated, or instead of pre-coating the substrate, some of these layers may be printed on the interlayer prior to lamination. The EO devices include electrochromic devices and liquid crystal devices. Variable transmission (VT) devices also include EO and thermochromic devices.

As a further objective, the laminates formed by this innovation may also be formed by depositing different thermoplastic polymeric compositions in different places on a first substrate and then sandwiching these into a single laminate using the second substrate.

In yet another objective, these principles may be used to form several components in a single laminate such as seals and active layers for an EO device. Busbars and other layers may also be optionally included to be printed in these assemblies as a part of the printing process.

Also, as an objective, the print or deposit pattern for the thermoplastic composition provides ready channels for air and/or gas bubbles to be evacuated during the lamination process so that bubble free laminates are formed.

As yet another objective, the present disclosure includes making a subassembly comprising more than two substrates and more than one polymeric interlayers, wherein at least one of the interlayers is deposited on one of the substrates by printing, and then laminating the subassembly.

In another objective, one of the substrates is removed after lamination, leaving behind the other substrate with the polymeric interlayer.

In a further objective, the polymeric interlayer 103 may be separated from both of the substrates after lamination, and thus the method of lamination used as a process to form only the interlayers in desired shapes and sizes.

Other features and characteristics of the subject matter of this disclosure, as well as the methods of operation, functions of related elements of structure and the combination of parts, and economies of manufacture, will become more apparent upon consideration of the following description and the appended claims, all of which form a part of this specification.

BRIEF DESCRIPTION OF DRAWINGS

FIG. 3 illustrates schematics of an electrooptic device being formed by laminating a pre-formed film;

FIGS. 5*a* and 5*b* illustrates a laminate EC device and its construction where the lamination layer and the primary sealant are both formed by additive manufacturing according to some of the embodiments of the present invention;

FIGS. 7a and 7b illustrate an EC device fabricated according to the embodiments of the present invention;

FIGS. 8a and 8b illustrate an EC device fabricated according to the embodiments of the present invention.

FIGS. 9a and 9b show schematics of a laminate where the first interlayer (903) between first and second substrates 902 and 904 is formed by printing on the first substrate 902 and the second interlayer is formed by sandwiching a pre-formed polymeric film (906) between second and third substrates 904 and 905, respectively.

DETAILED DESCRIPTION

Figure 1A:
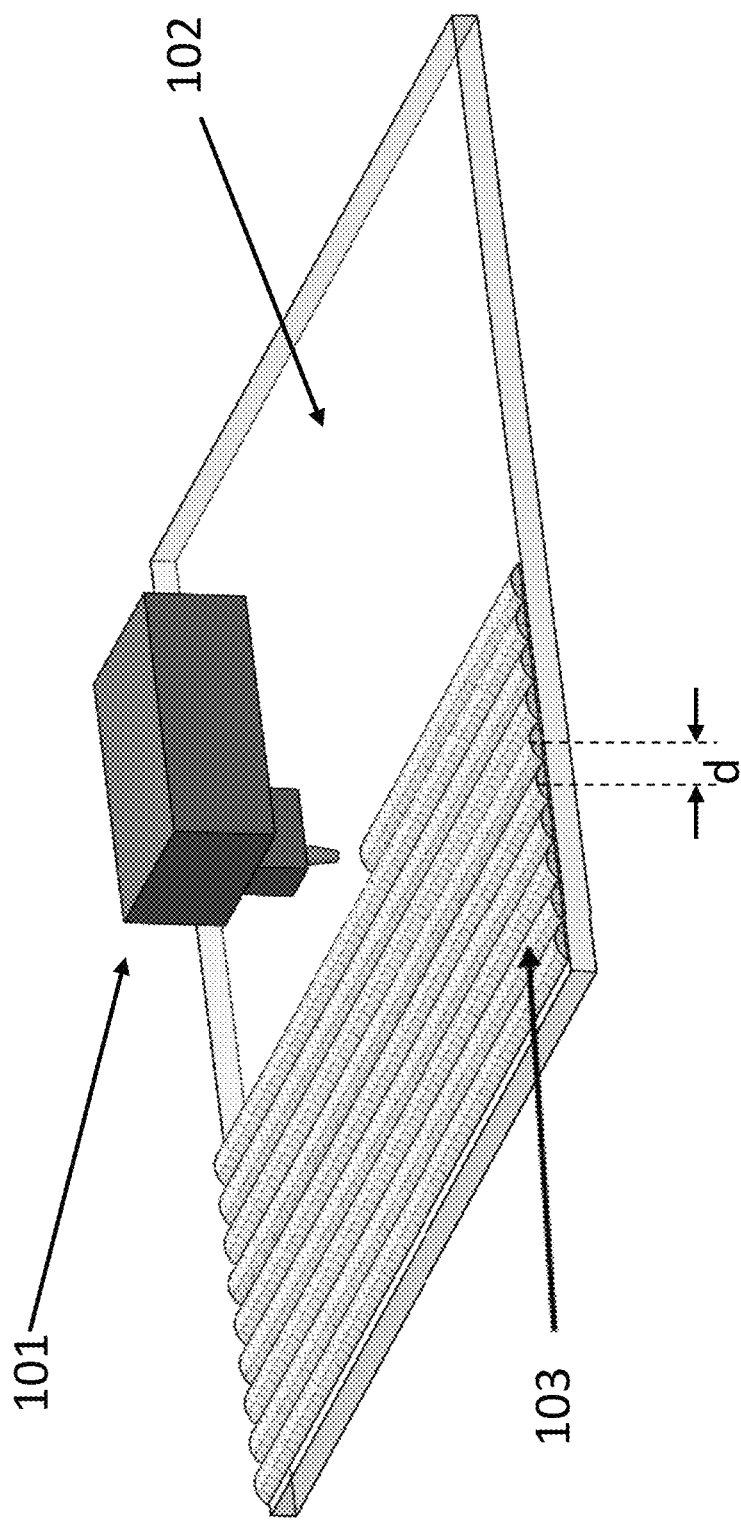
FIGS. 1*a*-1*c* illustrate construction schematics of a laminated device according to some of the embodiments of the present invention.

In one aspect, this invention is directed to laminate substrates with an interlayer where the interlayer is formed by a printing process. In another embodiment, the substrates processed by this inventive method are rigid. This means that the Young's modulus of the materials used for the substrates should be greater than 2 GPa. In another embodiment this value is greater than 10 GPa and yet in another embodiment greater than 30 GPa. The modulus is measured at 25° C. unless mentioned otherwise. In another embodiment Young's modulus for the substrate is measured at the highest temperature at which the laminate is used in the intended application, which can be in a range of about 25 to 120° C. depending on this application. In yet another embodiment the Young's modulus of the substrate may be measured at the highest processing temperature used to form the laminate which may be in the range of about 125 to 200° C. However, unless mentioned otherwise the Young's Modulus value used is at 25° C. Further, since the relative rigidity (or bending stiffness) of a substrate is dependent both on its material property and its thickness (for a given width), in one embodiment of rigidity, the bending stiffness obtained as product of its Young's modulus (in GPa) multiplied by square of the thickness (in mm) should be greater than 18. For example, a substrate with a Young's Modulus of 2 GPa and 3 mm in thickness will have this value as 2×3×3=18. In another embodiment, the bending stiffness should be greater than 30 and yet in another embodiment this should be greater than 50. Unless mentioned otherwise for the above calculations, the Young's modulus is measured at 25° C., although in other embodiments this may be measured at the use or the processing temperature as discussed earlier. The substrates in these embodiments may be similar thicknesses and materials or may be different thicknesses and materials which are combined with the interlayers to form the laminates. Some of the substrate materials are glass, silicon, polycarbonate, acrylic and polyester. In some embodiments more than two substrates and more than one interlayer may be used, wherein each substrate is separated from the next using an interlayer material. In some embodiments employing multiple interlayers at least one interlayer is printed. In another aspect, the interlayer thickness of the polymer in the finished laminate is at least 6 µm, in another embodiment at least 80 µm and yet in another embodiment at least 160 µm and in another embodiment at least 310 µm and in another embodiment 3.1 mm. For electrochromic devices the interlayer is at least 80 µm in one embodiment and 160 µm in another embodiment. The maximum thickness of this interlayer in one embodiment is 3.1 mm, in another embodiment this is 2.1 mm, yet in another embodiment this is 1.8 mm and in a further embodiment this is 0.9 mm. Further, in another embodiment of rigidity, the Young's modulus of elasticity of the interlayer must be lower as compared to the substrates, and in another embodiment this modulus should be at least a factor of 3 less as compared to the substrate when measured at 25° C. and yet in another embodiment this factor should be 10 or less, and in a further embodiment the interlayer hardness at this temperature ranges from about Shore A 20 to Shore D 60. Some polymeric materials commonly used as interlayer films to make laminates for various applications are polyvinylbutyral, fluorinated copolymers, ethyl vinyl acetate, thermoplastic urethanes or copolymers and ionomers containing these materials. The principles of this disclosure may also be used to form laminates of substrates where the substrates are not rigid, and may even have a lower modulus and/or hardness as compared to the interlayer.

In one embodiment, use of those glass substrates are considered which are either heat strengthened or tempered. Typically, the glass substrates which are heat strengthened are in a thickness of 1.6 mm or higher, and sometimes their thickness may be as high as 12 mm. Heat strengthening, or heat tempering process introduces an unevenness in the flatness of the substrate. As discussed later, when such substrates are used, the Z axis correction used in printing can be an important parameter in achieving uniform deposition of the thermoplastic composition. In addition, when such substrates are used, the minimum thickness of the interlayer (after lamination) is generally higher than the unevenness to achieve good quality and reliable lamination. In one embodiment the minimum thickness of the interlayer to be used with heat strengthened or tempered glass substrates is 310 µm, and in another embodiment this is 390 µm and in yet another embodiment this is 460 µm. The maximum thickness of the interlayers were discussed above and are applicable to these aspects as well. For some EO devices used for windows in buildings and transportation the temperatures during use can be high and uneven, and to avoid thermal breakage of the substrate, preferably such heat strengthened, or tempered substrates are used in their fabrication. For some of these devices, one of these substrates may be thicker than the second substrate, and only one of these may be tempered or strengthened depending on the pattern of thermal stress envisaged.

Figure 1B:
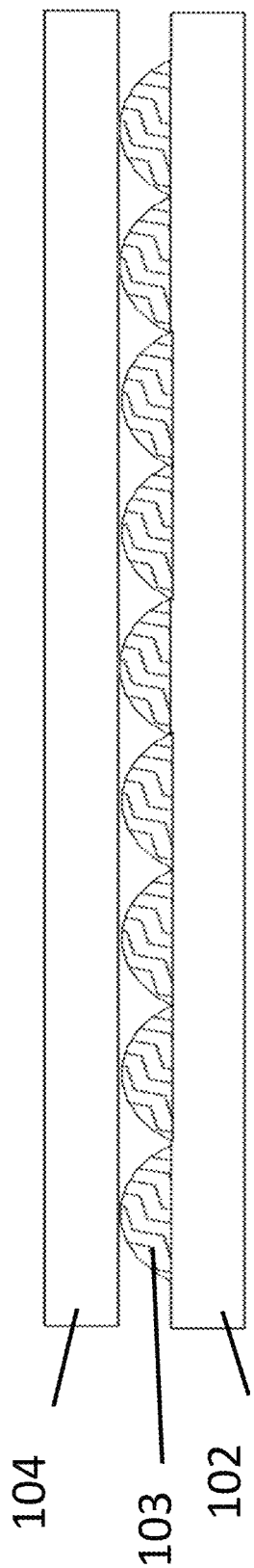
Figure 1C:
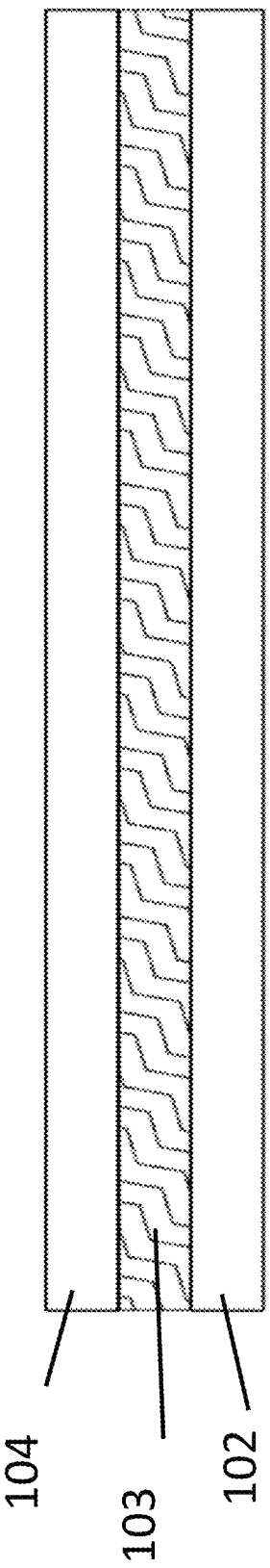

FIG. 1a shows a schematic process, where a laminated structure is formed using the principles taught in this invention. In FIG. 1a, a 3d dispense head 101 is shown as depositing a thermoplastic material 103 on a substrate 102. That is, the substrate itself is used as a printing bed. In some embodiments, the printed layer may be removed from the printing bed and placed on another substrate which is then laminated using additional substrate. As shown in FIG. 1b, after the deposition of the material is complete (which may be a single layer or multiple layers deposited on top of each other (in "z" direction), this substrate with the deposited material is mated with substrate 104, the thermoplastic composition (electrolyte layer in an EC device) 103 and the bottom substrate 102 are also shown. This assembly is then subjected to vacuum (or reduced pressure) to remove any entrapped air or gas and then subjected to heat and pressure to melt (or flow) the thermoplastic material 103, so that a laminate with a uniform polymeric thickness is formed between the substrates 102 and 104 and adheres to them (FIG. 1c). This laminate may be cooled while still maintaining pressure to a temperature 20 to 100° C. lower than the melt temperature (or the flow temperature) of the polymer. The cooling may also be done by removing the hot laminate to another chamber and then applying the pressure while it is being cooled down, or in some cases cooling is conducted under ambient pressure conditions. This method may be used to form laminated EO devices. These concepts will now be illustrated in more detail on how to form laminated electrochromic devices where the electrolyte is deposited by 3d printing and laminating rather than using only a pre-formed sheet for this purpose. Extensive details on electrochromic devices, material composition used for various layers including materials for electrolytes used as preformed sheets are in published PCT application WO2021021725A1, which is incorporated herein by reference in its entirety for all purposes, as the material compositions of electrolytes in this application may also be printed. In a further embodiment, additional components of these devices may also be deposited using this method. The other components include perimeter sealants and busbars, the material details of which are also in the above application. The interlayer itself might contain several layers of different material compositions printed on top of each other so that upon lamination, the interlayer comprises of distinct layers. In this situation at least one of the layers is formed using the principles of 3d printing and the other layers may use this method or any other method for forming the additional layers. EC devices formed by lamination of pre-formed multilayer films with anodic, electrolytic and cathodic characters respectively are disclosed in U.S. Pat. No. 8,115,984, and the composition of such layers and resulting devices are incorporated by reference herein. According to the present disclosure, such devices may be made by printing of the components of the electrolytic interlayer, where each composition sequentially on top of each other on the first coated substrate and then laminating using a second coated substrate. Each layer may be printed in a single pass, or as required using any number of passes to get the appropriate thickness, and the thickness of each layer may be different or similar. Upon lamination there would be adhesion and some mixing at the interface, however, depending on the lamination conditions, distinct character of each composition may be maintained in the electrolytic interlayer.

Figure 2:
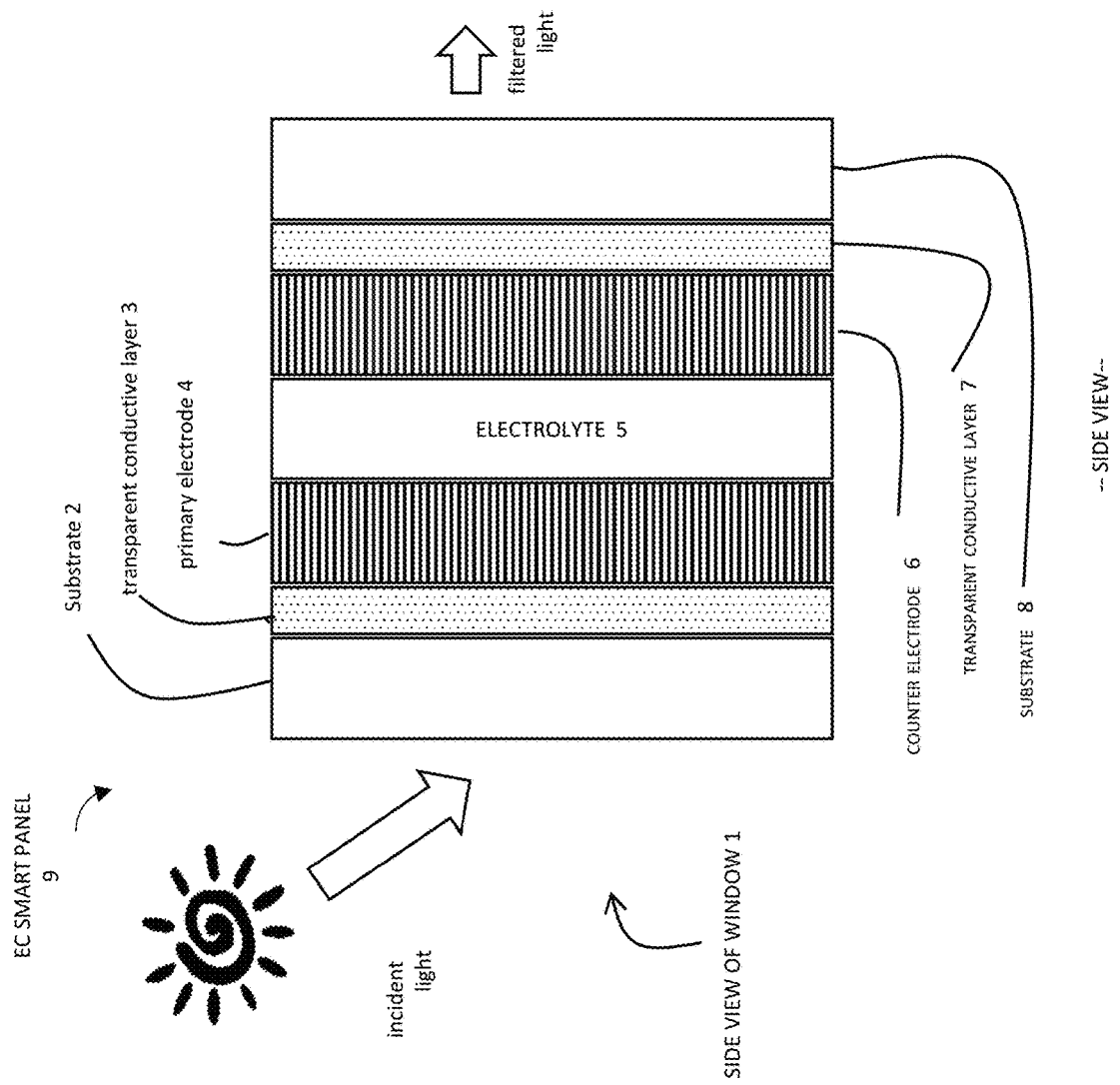
FIG. 2 illustrates a schematic of an EC device according to some of the embodiments of the present invention.

FIG. 2 shows a cross-section of an EC device panel which may be used in smart automotive glass and windows or building glass and windows. For building windows, the EC panels are used to form an integrated glass units (IGU) which comprises of one or more additional glass panels which are coated with a low-emissivity coating and are assembled with a gap between these panels including the smart panel. The structure and the mechanism of how EC devices work and some of the compositions and the properties of the electrolyte layer will be described so that it would be easier to appreciate this disclosure. The side-view of EC smart panel 9 of smart window 1 is configured with two opposing substrates 2, 8, having layers therebetween. For a window application, the substrates 2, 8 are transparent glass or plastic. In the illustrated example, both substrates 2, 8 have a transparent electronically conductive (TC) layers 3, 7, respectively. TC layers include materials such as e.g., indium-tin oxide, aluminum-zinc oxide, fluorine doped tin oxide and those layers of novel metals such as ruthenium, gold and alloys containing these materials. Other layers 4 and 6, in the EC panel are the EC layer (primary electrode) and counter electrode respectively, both considered as redox layers as they undergo reduction and oxidation as discussed below. Between the electrodes 4, 6, and in contact with them is an ion-conducting (electrolyte) material 5. Layers 4, 5 and 6 are also considered functional layers. When an electric potential is applied between conductive layers 3 and 7, the redox layer in contact with the negative terminal (e.g., layer 4) reduces, while the layer in contact with the positive terminal (e.g., layer 6) oxidizes. In addition, the layer being oxidized releases ions (such as lithium ions, $Li^+$) which are transported through the electrolyte layer 5 into the reducing layer. The electrons released are transported on the other side through the external powering circuit. This redox activity results in an optical color change of the device, i.e., the electrochromic activity. When a voltage with reverse polarity is applied or the circuit is shorted between the two conductive layers 3 and 7, then this reaction starts reversing with a reversal in optical properties and the previously reduced and oxidized layers start oxidizing and reducing simultaneously. In this example, the electrode 4 is formed of an electrochromic (EC) material; and the counter electrode 6 may also be formed from a material which does not have electrochromic properties or an EC material which is different from the one used in EC layer 4. In the latter case, the EC material of the counter electrode 6 has complementary electrochromic properties to those of the EC electrode 4. Complimentary means if the EC layer 4 darkens (or changes its optical state from a more transmitting state to a less transmitting state) due to reduction (i.e., insertion of cations and electrons from the conductive electrode adjacent to it) then simultaneously layer 6 also colors because of oxidation (i.e., loss of cations and electrons). Examples of inorganic materials that may be used for these layers which color by reduction contain tungsten oxide, and the layers which color by reduction may contain nickel oxide. both or one of these electrodes may also be formed of organic materials including conductive polymers. In one arrangement as described extensively in published U.S. patent application Ser. No. 20/190,145161 (application Ser. No. 16/231,909), the cathodic electrode is formed using a composition containing tungsten oxide, whereas the counterelectrode is formed using a polymeric matrix which has redox dyes and conductive particles. In one embodiment, when such EC devices with an EC electrode and a counterelectrode is made with a polymeric electrolyte, then using conventional device assembly methods, the polymeric electrolyte (also called interlayer) is introduced as a pre-formed film which is laminated between the two electrodes, or the two electrodes are assembled with a gap in between (using perimeter sealants) and the polymeric electrolyte is introduced in this gap later. In one aspect of the present disclosure, the electrolyte layer is introduced by printing on one of the substrates having the TC and one of the electrodes already coated, and then the second coated substrate is lowered, and the printed electrolyte layer is laminated between the two.

FIG. 3 shows another type of EC device construction and some aspects of its fabrication process where all of the redox materials are incorporated within the electrolyte. The two substrates 30a and 30b are coated with conductive layers 31a and 31b respectively. For a window device, these substrates and the conductive coatings are transparent. A polymeric interlayer 32 is sandwiched as an electrolyte between these substrates to form the device. These redox species (e.g., electrochromic dyes) are present in the electrolyte. For example, electrolytes containing EC dyes (anodic and cathodic dyes) are disclosed in published US patent publication 2022/0155648, from which the components of the electrolytes are incorporated herein by reference. Such EC device are made by laminating this electrolyte layer between a pair of conductive substrates. The construction of liquid crystal devices is similar where the sandwiched polymeric material (interlayer) between conductively coated substrates has liquid crystalline material incorporated homogenously in this polymeric material or it is present in small domains within the polymeric matrix as a discrete phase. For the latter, the size of the domains in one embodiment is about less than 2 times the thickness of the polymeric material and in another embodiment less than 10 times the thickness. and the electrical connections close to the perimeter are made to the transparent conductors as shown by 35*ab* and 35*bb*.

It is also essential that these devices are sealed at the perimeter so that ambient elements such as moisture and oxygen in air do not interact with the redox electrodes and the electrolytes, i.e., these elements are sealed and protected from moisture and air/oxygen. The sealants are not shown in FIG. 2, but it is intended that all such devices will be sealed at the perimeter. The perimeter sealant for device in FIG. 3 is shown as 36*a* and 36*b*. The sealants have good barrier properties against the transportation of moisture and air from outside and transport of any electrolytic components from the inside to the outside.

To prepare the devices by methods using pre-formed electrolyte sheet and redox layers, the substrates are first coated with a TC. The perimeter region where the busbar and the perimeter seal would be present, is either masked prior to the deposition of redox coatings or the coating process only coats the desired area avoiding this perimeter region or the coating is removed from this region after deposition. The busbars are placed on the substrate surface near the edges (before or after the deposition of the redox coatings) and should be far enough from the central region so as not to contact the redox layers or the electrolyte layer. The electrolytic sheet is cut and placed on top of the redox layer of one of the substrates and its size is slightly smaller than the area occupied by the redox layer to allow for its areal extension when pressure is applied during lamination so as to cover the entire redox coating area or leave a small perimeter region (like a ring) of the redox material that will be covered by the perimeter adhesive (or sealant). The sealant is applied in an extruded tape form or dispensed on one of the substrates occupying the region between the redox layer and the busbar, and it may also overlap the busbar to electrically insulate the busbar on the two substrates from each other and also from contacting the redox and the electrolyte layers. Instead of using the pre-formed film as is known in the art, the electrolyte may also be deposited in a pattern as claimed in this disclosure along with the perimeter sealant.

During lamination the sealant will also squeeze (i.e., spread out or expand laterally), thus enough allowance should be given to accommodate this so as to form almost a seamless joint (no gap) between the sealant and the electrolyte. The sealant may even overlap the redox layer edges by a fraction of a mm or even by a few mm. During lamination, vacuum is applied to remove any trapped air and moisture or other volatiles before the before the lamination pressure is applied under heat. The electrolyte film and the sealant film may have a surface texture to efficiently remove any trapped gases by applying a vacuum to the assembly (comprising the two substrates and the interlayer) so that no bubbles are formed during or after the process. In applying this vacuum one has to consider the vapor pressure of any plasticizers in the electrolyte which are not removed. After evacuation, pressure and heat is applied to the assembly to form this laminate. Based on the size and geometry of the substrates, one can pre-determine the areal extension of the perimeter sealant and the electrolyte (due to the pressure by the lamination force perpendicular to the direction of extension) so that these are sized properly and just enough lateral gaps are left when these are placed so that these laminate assemblies desirably form seamless edges at the designated boundaries.

Although the detailed compositions of the interlayers discussed in the devices above are different, some components are generically similar. The thermoplastic polymer to form the interlayer may be made using several types of polymers and copolymers including acrylics (examples are alkylmethacrylates, hydroxyalkylacrylates and carboxyalkylacrylates), vinyls (examples are vinyl butyral, vinyl acetate and vinyl alcohols), fluoropolymers, polyurethanes, polyureas, ethyl-vinyl acetate, polyesters, nylons, silicones, polycarbonates, copolymers, graft copolymers, blends of these or other thermoplastic polymers. These compositions may have several additives and may vary on the type of the VT product. These additives, depending on the type of device include UV stabilizers, plasticizers, salts, electrochromic dyes, liquid crystalline materials, thermochromic materials (including thermochromic dyes), viscosity modifiers, adhesion promoters, defoamers, surfactants, fillers, tackifying agents, levelling agents, colorants,, monomers and associated catalysts that may be polymerized (including crosslinked) after the lamination process to provide superior mechanical, thermal and/or adhesion properties. In one embodiment the salts present in the interlayer electrolytic compositions are soluble in the plasticizer, if a plasticizer is present in the formulation. Polymer in the said thermoplastic composition may be amorphous or semi-crystalline. Melting point means the temperature at which the composition will flow. Melting point and flow point (or even the glass transition temperature of amorphous polymers) are used interchangeably and mean the same, where the molten polymer composition shall flow, even if the polymer does not have a classical melting point. The melting point or the flow point may be associated with one of the phases present as domains in multi-phase block polymers which hold the solid polymer shape unless these domains melt or flow. Polymeric thermoplastic melt is used for the state of composition at a temperature where this will flow when extruded. In one embodiment amorphous polymers are preferred to make such compositions for VT devices.

Many thermoplastic interlayer polymer compositions used in EO devices generally have at least one low glass transition temperature (Tg) and a higher melting point or a second Tg located at higher temperature. Low Tg means that this Tg is lower than −20° C. (minus 20° C.) in one embodiment and lower than −40° C. (minus 40° C.) in another embodiment. These polymers may be block copolymers or those which exhibit more than one compositional phase. For multiphase systems (e.g., block copolymers forming multiple phases) the Tg of at least one of the phases must be low as discussed above. These thermoplastic polymeric compositions for the interlayer may be formed by adding the desired additives to the polymer and blending these past the melting point of the composition. In another embodiment all ingredients are added together with the monomer(s) and polymerization catalysts in a monomeric liquid composition which is blended well and then the monomer is polymerized to yield the thermoplastic polymer. For example, the polymerization may be activated by heating the liquid composition. The thermoplastic composition formed be either of the methods may be pelletized or formed into strands or ribbons for feeding the 3d-printer, or alternatively the monomeric liquid formulation is fed to the printer head, which heats or irradiates the formulation and polymerizes the monomeric component resulting in a thermoplastic composition as it passes through the head and deposits that on the substrate. Alternatively, the monomeric formulation can be deposited and then undergo heat and/or light exposure treatment resulting in polymer formation.

The thermoplastic compositions for any of these interlayers may further include additional unpolymerized monomers and oligomers with suitable catalysts which may be polymerized (including crosslinking) after the thermoplastic composition has been deposited and laminated. This polymerization and/or crosslinking may be initiated by heat and/or radiation, for example by heating to a higher temperature or subjecting the assembly to UV and/or light radiation. The thermoplastic polymer may itself have polymerizable groups which are initiated by a different mechanism after the deposition and lamination has been completed. In another embodiment monomers may also be present in the pre-deposited coatings on the substrate which are in contact with the electrolyte and may also polymerize at this time with the monomers in the interlayer forming interfacial covalent bonds. As an example, to form thermoplastic urethanes the monomers typically comprise of three materials, i.e., a diisocyanate (aliphatic diisocyanate is used for good UV durability if that is important for the application), a diol which is a chain extender (generally with a molecular weight of 62 to 400) and a diol that forms primarily the soft segments (usually with a molecular weight of 600 to 3,500). For acrylics and methacrylics, one may use more than one monomer and the polymerization may result in the formation of homopolymers or copolymers including block copolymers. In one novel composition, the thermoplastic polymers are made by reacting diols with monomers which have both isocyanate and acrylic groups or incorporating such monomers within the thermoplastic polyurethane polymers. The acrylic groups are polymerized (and/or crosslinked) post lamination (e.g., by radiation) to enhance the mechanical properties of this film. These compositions may have other additives including catalysts some or all of which are added by the manufacturer of the monomeric composition or these are added later just prior to printing.

Examples of aliphatic isocyanates are 4,4'-methylene dicyclohexyl diisocyanate (H12MDI), isocyanatomethyl-1, 8-octane diisocyanate, 1,4-cyclohexanediisocyanate (CDI), hexamethylene diisocyanate (HDI), isophorone diisocyanate (IPDI) and mixtures thereof. chain extender is selected from the group consisting of ethylene glycol, diethylene glycol, 1,3-propylene glycol, 1,4-butylene glycol, 1,3-butylene glycol, 1,5-pentamethylene glycol, 1,6-hexamethylene glycol, neopentyl glycol, and combinations thereof. Examples of diols for soft segment are poly(tetramethylene ether glycol) (PTMEG), poly(ethylene glycol), poly(propylene glycol poly(butane diol carbonate), poly(ethylene glycol sebacate), poly(propylene glycol sebacate), poly(diethylene glycol sebacate), poly(ethylene adipate)diol, and poly(1,6-hexyl carbonate)diol and combinations thereof. One way of incorporating acrylate groups in thermoplastic urethanes is to use acrylated diols. An example of such a diol being glycerol monomethacrylate. For forming these thermoplastic urethanes, the monomers, i.e., the isocyanates, diols for soft segments, the chain extenders, acrylated diols and catalysts which promote the reaction between the isocyanate groups and the hydroxyl groups are mixed together and reacted as discussed above. Examples of catalysts which promote reactions between the hydroxyl and the isocyanate groups are dibutylditinlaurate, K-KAT™ (from King industries, Norwalk, CT). Such thermoplastics may contain additional agents (initiators or catalysts) to promote acrylate polymerization, and these are also added with then other monomers when the thermoplastic urethane is made, but during the formation of the thermoplastic, the conditions are such that the acrylate groups do not polymerize. If acrylate polymerization is to be activated by UV, photoinitiators (or UV catalysts) are added to the above composition prior to the formation of the thermoplastic. Persons of ordinary skill in the art reading the present disclosure will understand and recognize suitable photoinitiators to be used in the disclosed processes. Some non-limiting examples of photoinitiators are Irgacure 2959, Irgacure 184, Irgacure 907, etc. These photoinitiators may be obtained, for example, from IGM resins (Charlotte, NC). As discussed above, post lamination, the urethane thermoplastics with acrylate groups may be polymerized by subjecting them to the UV radiation which will crosslink the thermoplastic polymer chains and form a thermoset.

One or both of the redox layers present in an EC device may be also formed by printing. As an example, in FIG. 2, the print bed may be substrate 2 coated with transparent conductor 3. The primary EC electrode 4 may be a pre-deposited layer or may be formed by any type of deposition process, followed by the 3d-printing of electrolyte layer 5 as disclosed herein, which may be further followed by the deposition of layer 6. Substrate 8 pre-coated with layer 7 and 6 (if layer 6 is not formed on the electrolyte) is lowered to form the laminate. During the lamination process, bubbles are pulled out from all of the layers simultaneously and heat and pressure is used to flatten these deposits into neat stack of layers. The printed layers may all have different thickness, and some or all may be formed by a single pass of the print head, and others may require multiple passes. The thickness of the redox layers is generally in the range of about 0.1 to 25 µm, and in some cases may be as high as 50 µm. It is also possible to make material variations in each pass within each of the functional layers, so that each functional layer may have more than one sub-layer. In one embodiment the EC and/or the counterelectrode layer is formed by using the principles of 3d printing on top of the 3d printed electrolyte layer.

Since many of the components, particularly the interlayer materials used in the fabrication of the EC or other EO devices are sensitive to oxygen and humidity, some of the coating deposition and the assembly of the laminate may be conducted under inert conditions (e.g., under dry nitrogen and or dry argon) and then moved to the lamination chamber, where vacuum (reduced pressure), heat and lamination force on the substrate are applied. If these are assembled in vacuum bags, degassing may be done at room temperature and after closing the vacuum outlets, heat and positive pressure from outside of the bags (or force) is applied to form the laminate.

When printing interlayer thermoplastic compositions by additive printing, there are several variables which are to be considered. It is important that the substrate position is in close registration with the tip of the print head and there is no unintended relative movement. The print head may move both in X and Y direction, having Z direction controlled by moving the print-bed, or optionally, one of X or Y movements may be provided by substrate movement and Z and X or Y controlled by the substrate or any feasible combination. The control of substrate temperature, i.e., the print-bed temperature is important. Typically, the substrate temperature is less than the melting point (or the flow temperature) of the thermoplastic composition which is being deposited. In one embodiment, this temperature is about 50 to 200° C. less than the melting or the flow point of the thermoplastic polymer composition, and in another embodiment this range is about 50 to 100° C. Thermoplastics used for EO devices for use in building and transportation window applications may have a flow point (or melting point) in the range of 100 to 250° C. (and any specific temperature or specific temperature range selected from within the range of 100 to 250° C. is a part of this disclosure). Keeping the substrate temperature elevated allows the dispensed bead from the print head to immediately tack to the substrate without being pulled by the viscoelastic forces of the melt. Further, the print heads have a z-axis sensor which maintains a predetermined distance between the substrate (dispensing plane) and the dispensing tip of the head. In case the interlayer material is deposited by printing several layers on top of each other, the distance between the dispensing plane and the dispensing head for each layer would be controlled, which may be the same for each layer or different. This control is exercised by either moving the substrate down relative to the dispensing head or by moving the dispensing head to achieve this. In one embodiment, the layer height may be varied during the printing of different layers. In some aspects, the layers may have different thicknesses. In certain aspects, the first layer is thicker than the subsequent layers by a factor of, e.g., up to 1.5. When laminates are formed using curved or bent substrates or when using heat strengthened or tempered glass which has unevenness in terms of flatness, this distance is dynamically adjusted during printing taking into account the curvature or unevenness aided by a probe sensor.

The shape and size of the bead being deposited may be varied. The bead being dispensed (based on the shape of the dispensing die) may be circular, elliptical, rectangular ribbon shape or any other. Control of the distance (or spacing) between each dispensed line (hatch distance) is important. This is shown as "d" in FIG. 1a. These variables are optimized by changing the dispense rate, flow rate, extrusion multiplier, travel speed, to achieve the final thickness required of the layer being deposited. The distance should be such so that when vacuum is applied during lamination, any trapped gases (even nitrogen or argon if processed under inert atmosphere) are easily extracted to obtain bubble free laminates. For example, the pattern shown in FIG. 1a-1c, allows natural channels for this type of extraction before heat and pressure is applied to melt and have the thermoplastic composition to flow and to form a contiguous film.

The patterns formed by printing do not have to be lines, these could be discrete beads, cross hatched patterns, or any other type of patterns which would help in achieving the objective. The shape and volume of the material of the bead should be optimized to reach a uniform layer thickness in the laminate once the lamination pressure is applied.

Since one of the advantages of this process is the ability to make laminated products in any shape (e.g., rectangular, triangular, circular, etc.) and size, it is important to have a well-defined edge (or the border) of the print area. In a high production environment, the required thickness should be obtained with the least number of passes which will result in uniform thickness after lamination. The thickness of the interlayer for the electrolyte was given above, keeping those in mind, in one embodiment the height or the average diameter of the dispensed bead is in the range of 0.005 to 2 mm. In another embodiment this number is in the range of 0.1 to 2 mm. In case a flat ribbon is deposited, the height constraints are similar as above and the width in one embodiment may extend to 5 mm and in another embodiment to 15 mm. The wider ribbon like dispense may provide faster processing times for large area rectangular windows. Typical EC windows have an active area of larger than about 700 sq. cm and may be as large as several square meters (e.g., 2 to 5 sq. meters or larger). In one embodiment during printing, after each line, the material is briefly retracted into the print head so that excess material is not deposited at the edge of the print area. In another embodiment the bead is continuous and is simply turned by 180 degrees at the end of the line and displaced by a set amount. The rate of dispense may be managed to control the material deposited at the ends and conforms to the intended radius of curvature of the continuous bead to avoid over and under-dispensing at the turns.

For laminates made by this invention, the thickness range of interlayers is in the range of 5 μm to 3.1 mm as discussed earlier, since these are thickness of the interlayers after lamination, the bead height may be slightly higher so that once this is compressed during lamination then the required thickness is obtained.

An important consideration during lamination process is de-acrating so that bubbles are not trapped in the finished laminate. However, at the same time the plasticizer or other additives which are present in the interlayer material or to any layer should not be removed which will adversely impact the device performance or give rise to visual defects. In order to avoid and/or reduce this from happening, the vapor pressure of any of these additives should be lower than about 1 KPa or preferably lower than 0.05 KPa at 25° C., and further the time for degassing should be short to minimize plasticizer loss. In one embodiment the processing parameters are selected to keep this loss less than 10% by weight of the plasticizer or any other volatile additive which is initially present and is required for the proper functioning of the device. In another embodiment this number should be less than 5% of the initially present such additives. In case plasticizer is also added in one of the pre-deposited coatings on the substrate, then its loss should also be minimized or kept low as discussed above. As an example, during the lamination process, once the thermoplastic composition is placed between the two substrates the degassing under reduced pressure is carried out prior to heating and application of lamination pressure (e.g., vacuum or reduced pressure operation may be started at room temperature). The reduced pressure may be maintained during heating to a temperature where the loss of the plasticizer is low before application of the lamination pressure. Further the laminate may be cooled by about 20-100° C. below its melting or flow point (dependent on material properties and flow characteristics), prior to releasing the lamination force on the substrate. For most part, at a given temperature, the reduced pressure used for degassing, should preferably be higher than the vapor pressure of the vapor pressure of the most volatile additive which has to be retained in the device. For example, electrolytes for EC devices may use propylene carbonate (PC) as a plasticizer, and degassing for this is conducted at reduced pressures of 0.005 KPa or higher at 25° C., as the vapor pressure of PC at this temperature is about 0.003 KPa (Nasirzadeh, K., et al, J. of Chemical and Engineering Data, Vol 50(1) (2005) p26-28). Since the vapor pressure increases with increasing temperature, thus as the substrates are heated the pressure around the assembly is changed so that the plasticizer is not removed by the change of its vapor pressure. In one embodiment the reduced pressure should be a multiple of about 1.1 to 10 of the vapor pressure of the additive measured at the temperature of the process.

Incorporation of Perimeter Sealants

For EO and certain other devices, during use or product life-time, the interlayer and some of the other layers in the device have to be protected from air and water (including water vapor) ingress, and also prevent materials from the interlayer leaving the system. For this a perimeter sealant is required which has low permeability to air and water and also to any of the ingredients which are present in the interlayer and may migrate out with time. Thus, the perimeter sealant polymer composition will be different as compared to the polymer composition (including polymer type) from the interlayer. The deposition of both the sealants and the interlayer by printing prior to lamination is more manufacturing friendly as compared to placing sealant strips near the perimeter and cut sheets of the interlayer in the center. For example, electrolytic or any other composition for the interlayer is deposited on the substrate covering substantial area but leaving the perimeter area (of about a 2 mm to a 4 cm from the edge), and then depositing a sealant composition in the perimeter area so that upon lamination a laminate is formed resembling a picture frame where the sealant material is located on the border region of the laminate. When using printing to deposit these layers according to the current invention the edges and corners of this picture frame where the sealant and the interlayer meet, are cleaner with superior spatial precision. The relative height of the as deposited materials in these two regions may be different with a small lateral gap in between, so that upon lamination the materials are squeezed and flow so that this gap is closed, with the interlayer and the sealant compositions almost touch each other and all of the materials reach the same height which results in uniform separation between the substrates in the finished laminate.

To speed up the deposition process, multiple print heads may be used for each of the materials, or several for each material, so that the desired processing throughput rates are achieved. More than one sealant may be used, where the first sealant is deposited around the entire perimeter of the active interlayer, and the second sealant circles the perimeter of the first sealant. These are respectively called primary and the secondary sealants. Again, their heights, widths and distance amongst these components may be different as deposited. However, all of these must flow during lamination like a thermoplastic. Any of the interlayer or the sealants may be polymerized further (e.g., including cross linking) post lamination. The secondary sealant may have moisture cure properties, where over a period of several hours or days moisture may migrate in this sealant only and cure the sealant through the hydrolysis and condensation of alkoxy groups. Any volatile materials released leave this sealant by migrating outside and should not migrate into the active interlayer. The primary sealant provides the barrier properties mentioned above, and the secondary sealant protects the primary sealant from getting damaged, prevents liquid water in coming in contact with the primary sealant, and may also provide superior structural properties.

The secondary sealant may also be a two-component system which may cure after lamination is completed. In one embodiment, the thickness of the as-deposited primary sealant is greater than the thickness of the thickness of the as deposited secondary sealant and of the as-deposited interlayer. The primary sealant striations or pattern or channels on its top surface or through its thickness are continued from the interior of the device to the outside when the second surface is lowered and rests on the primary sealant. At this stage the assembly is subject to vacuum (or reduced pressure) to remove the trapped air or gasses. After this the temperature is raised and laminating pressure is applied to press and flow the primary sealant so that the top substrate comes in contact with the interlayer and the secondary sealant. All of the three components are squeezed due to the lamination force so that any lateral gaps between these close and a bond is formed with the substrates separated by a uniform distance containing all of the sandwiched components. The secondary seal provides structural strength and also protection to the primary seal from coming in contact with water and other aqueous solutions. The secondary sealant may also be cured during lamination if so desired. For some constructions, the secondary sealant may even be applied as a bead after the lamination process onto the edges of the laminate and also squeezing the sealant into any edge gaps that may remain between the two substrates. This sealant may be in a tape form, where the sealant is incorporated on a polymeric backing. Some examples of these are Argosealplus™ and BOC-9450 both from SWM International (Greenfield, MA). Argosealplus™ further has a metallic layer sandwiched between the polymeric layer and the adhesive (or the sealant material). These tapes with sealants are applied at the edges. Care has to be taken that busbars or conductive paths emanating from the device that passthrough holes or gaps in this tape should not simultaneously come in contact with the metallic layer in the tape as that could create an electrical short between the opposing busbars. Depending on the tape characteristics this may be applied before or after lamination.

Figure 4A:
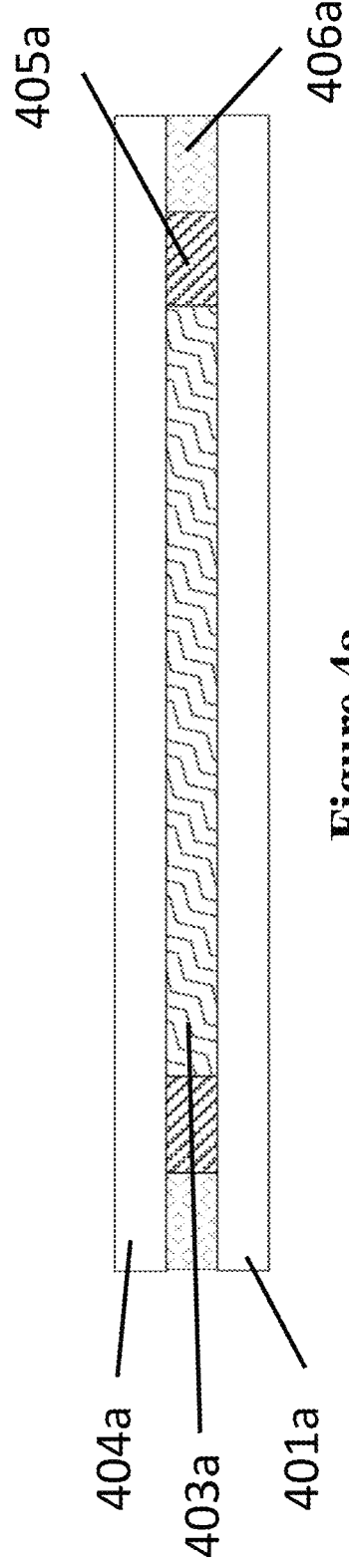
FIGS. 4*a*-4*c* illustrate laminate constructions along with primary sealant, and secondary sealants formed in different ways.
Figure 4B:
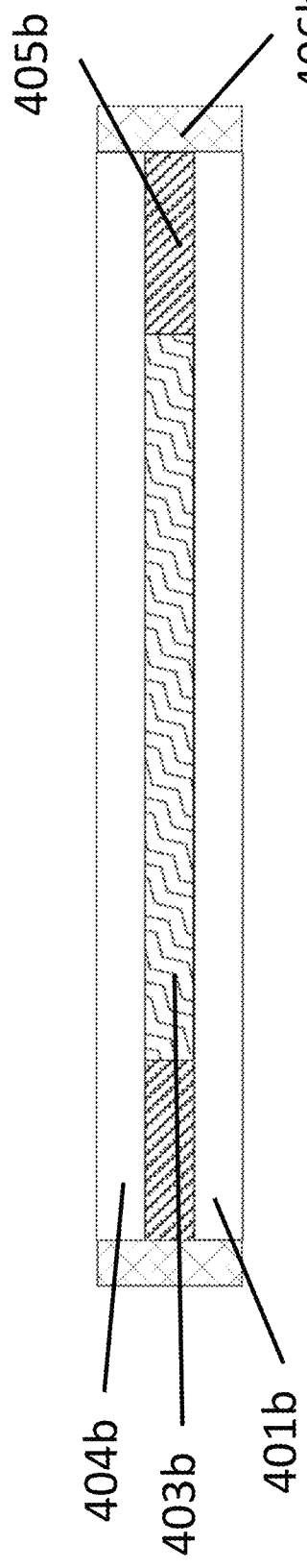
Figure 4C:
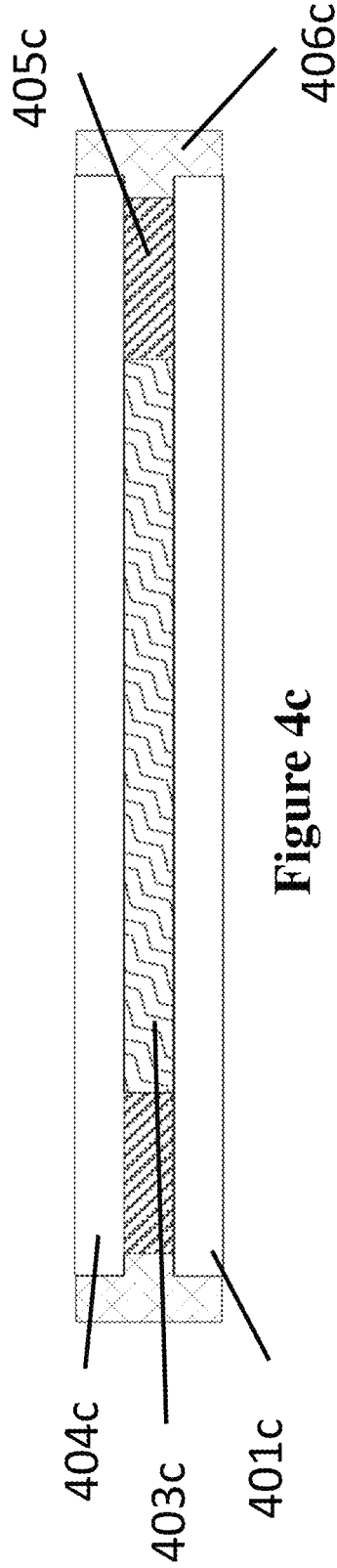

FIGS. 4a-4c show three configurations of a laminate cross-section with primary and secondary sealants. For simplicity, in these figures any other layers and busbars which are required for EO devices are not shown. FIG. 4a shows that both the sealants are present within the laminate. The two substrates 401a and 404a are shown with the interlayer is shown as 403a. The primary sealant 405a and the secondary sealant as 406a are also shown. This and FIGS. 4b and 4c are also applicable to EO devices, but for simplicity other layers or busbars are not shown, for example the interlayers in all of these figures (FIGS. 4a-4c) could be electrolyte layers of an EC device. To form the device of FIG. 4a by the current invention, in addition to depositing the interlayer by additive printing, both or one of the two perimeter sealants may also be formed by additive printing on substrate 401a or by dispensing both or one of sealants as an extruded bead prior to the assembly with substrate 404a.

FIG. 4b shows the secondary seal 406b only at the edge of the substrates 401b and 404b and protecting the primary sealant 405b and the interlayer 403b. This sealant may be a tape as discussed earlier or a sealant where this is applied after the formation of the laminate. The primary sealant is applied prior to the laminate formation as discussed above. FIG. 4c shows the secondary seal 406c at the edge of the substrates 401c and 404c and also shows a slight pinch between the substrates where it protects the primary sealant 405c and the interlayer 403c. The secondary sealant 406c is applied as in before or after the laminate assembly, in the former, the sealant is squeezed out and is then spread over the edge and in the latter it is applied after lamination and any gaps between the substrates close to the perimeter are filled. Although several print heads may be used to dispense the sealants and the interlayer, it is not necessary that all of these materials will have similar flow profiles at a given temperature or even have the same melting (or flow) points for this deposition. For example, for some of these the substrate temperature and the deposition temperature may have to be different. The deposition temperature and the substrate temperature may have to be changed for different materials, although a common lamination condition is used. One of these sealants is dispensed by printing several layers in a desired pattern, and the other sealant by a simple XY dispensing of a single bead. In one embodiment, at least one of the sealants (or at least the primary sealant) and the interlayer are deposited at temperatures which are within 20° C. of each other. In another embodiment the substrate temperature for depositing at least one of the sealants (or at least the primary sealant) and the interlayer are the same.

As an example, to make an EO device comprising an interlayer and at least one perimeter sealant, the interlayer composition is deposited by printing to a certain specific average height, the primary sealant is deposited to a different average height and the secondary sealant if dispensed may have a third average height. In addition, the interlayer and the primary sealant will have a pattern on the surface or in the structure for degassing. All these heights are at least equal to or greater than the required final separation between the two substrates after lamination process is over. As another example, the interlayer may be dispensed in a range of 120 to 160° C., the primary sealant in the same temperature range, and then these deposited materials are cooled below their melting temperature prior to mating with the second substrate. During lamination, after degassing, the temperature is raised above the melting point of the interlayer and the sealant(s).

In one embodiment, the height of the as-deposited primary sealant is about 5-30% in excess of the height of the as-deposited interlayer and some gap is left between the interlayer and the primary sealant. This gap fills during lamination due to the flow of the sealant and the interlayer. In another embodiment, the as-deposited primary sealant average height is about 15 to 50% of the as-deposited interlayer average height. In another embodiment, the average height of the secondary sealant (if used and dispensed on the substrate prior to lamination) is the same as the interlayer average height or at least less than the as deposited primary sealant average height.

The thermoplastic primary sealants are formed of materials which have low air and moisture permeability, such as polyisobutylene, polyacrylonitrile, polychlorotetrafluorethylene, polyvinylidene chloride, etc. Sealants may also be formed using block copolymers, such as triblock copolymers where the central block is one of the low permeability polymers (e.g. polyisobutylene) and the end blocks are those materials which phase separate into domains with higher melting point or glass transition temperature (e.g. polystyrene, acrylic) which provide the mechanical properties and dimensional stability to sustain all temperatures during the intended product application. The melting point (or the upper use temperature) of these materials is determined by these domains. The block length in these copolymers is adjusted so that the volume occupied by the low permeable material exceeds 50%, and in another embodiment exceeds 70%, so that it forms the continuous phase with isolated discrete domains embedded in the continuous phase. Some examples of secondary sealants are single and two component silicones and polyurethanes. These sealants (primary and the secondary) have a thermal expansion coefficient which is similar to that of the interlayer in the temperature range of use. Generally, this means that for most applications the average thermal coefficient difference between the primary sealant and the interlayer is within ±25% when measured in the range of −40 (minus 40) to 100° C. In another embodiment, the glass transition temperature (Tg) of the sealant (i.e., the dominant or the continuous phase by volume of the sealant) should be below the lowest use temperature or at least −40° C. (minus 40) for those laminates subjected to outdoor temperatures in North America.

FIGS. 5a and 5b show schematics of a laminate where the interlayer and the primary sealant are dispensed using additive manufacturing and then laminated. This construction may be used for EO devices and the secondary sealant added in a number of ways post-lamination as discussed earlier. For simplicity other layers and busbars if used for producing EO devices are not shown. Substrate 501 in FIG. 5a is shown without any coatings or busbars. The primary sealant 505 and the interlayer 503 are printed by using additive manufacturing. The height of the printed sealant 505 is generally higher as compared to the height of the printed interlayer 503, and a space is shown between all around the outside perimeter of the interlayer and around the outside perimeter of the sealant. Substrate 504 is lowered to sandwich these printed layers and the laminate is formed as shown in FIG. 5b where the gap after lamination between the substrates is uniform (FIG. 5b shows the cross-section of the device along the section taken at the dotted lines in the isometric view shown in FIG. 5a only after the laminate is formed after lowering substrate 504. Again, no coatings or busbars are shown on substrate 504, if used to produce EO devices. During lamination as substrate 504 initially rests on the printed sealant (and/or the interlayer), the channels formed by print pattern of the materials allows removal of any trapped air or gas when subjected to reduced pressure and then under heat and laminating force (pressure) the printed thermoplastic materials flow to achieve uniform separation between the substrates and may also close any gaps outside the parameters of the printed layers.

Fabrication of Complete EO Devices

This is illustrated for EC devices which include redox layers, busbars in addition to the electrolytic interlayer and perimeter sealants (for example the devices described earlier in FIG. 2). For EC window devices, the redox coatings are removed or not deposited in the perimeter region of the window area in a typical width of about 1 to 4 cm from the substrate edge and the transparent conductor covers the entire area of the substrate. This region or zone is used both for the perimeter sealant and the busbar. The busbars are located within this region close to the substrate edge either all around the perimeter or along at least one edge of the substrates (usually along the longer edge). The width of the busbar is about 0.2 to 1.5 cm and do not touch the redox layers (if present) or the electrolyte. In general, the electrolyte completely covers the area occupied by the redox layer. Depending on the materials and the types of busbars used, their thickness varies between about 10 μm to 150 μm. These busbars may be placed only along one side or two sides of the substrate (or partial perimeter) or all around the perimeter of both the substrates. Busbars placed all around the perimeter or on two sides of the same substrate of the device have an advantage of applying power from several sides of the window which increases the speed of transition (coloring and bleach speeds), however, since the busbars at the perimeter will stack up, their thickness combined should be lower than the electrolyte thickness. Further either the perimeter sealant fills the gap between the opposing busbars or another non-conductive coating or a material is deposited to avoid electrical shorts between the two substrates. To further increase the speed of transition internal busbars may also be used as described in U.S. Pat. No. 6,317,248.

Figure 6:
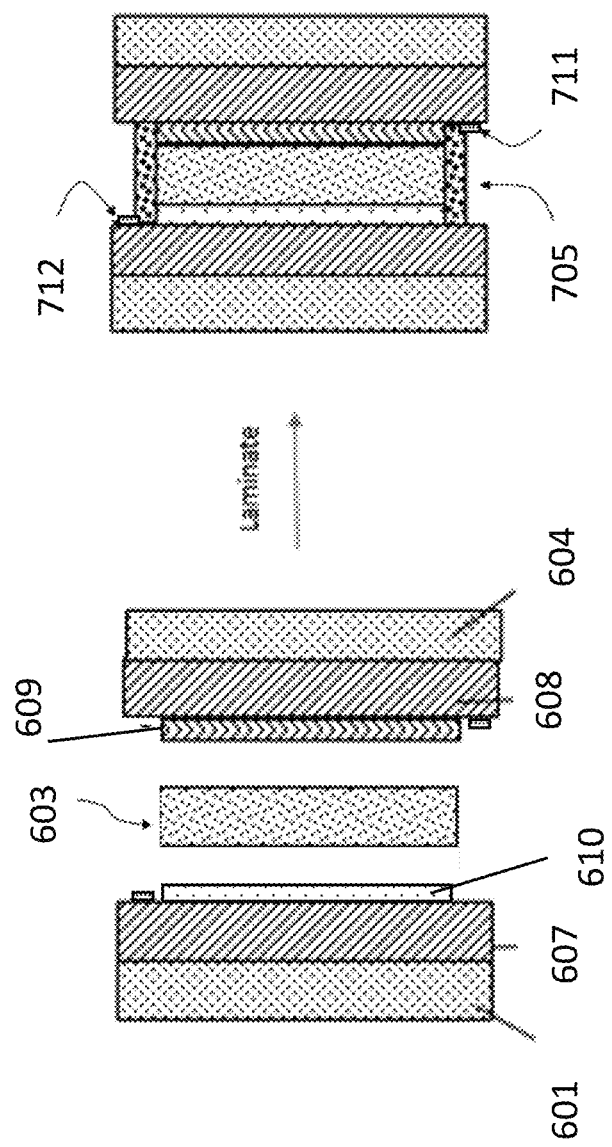
FIG. 6 illustrates and EC device and its construction according to prior art.

FIG. 6 shows details of a conventional method of device formation of the type shown in FIG. 2. The substrates 601 and 604 are coated respectively with electrically conductive layers 607 and 608. For transparent window devices these are transparent conductors. Layer 610 is the EC layer and layer 609 is the counterelectrode where these are brought together by sandwiching an electrolyte layer 603 and also placing a sealant material at the perimeter. In one conventional method the electrolyte layer and the sealants are pre-formed as a film and as an extruded strip respectively, and in another conventional method the device is fabricated by first assembling the substrates with the perimeter sealant while leaving a gap between the two for electrolyte introduction. The electrolyte in a liquid form is then introduced via a hole in the sealant or in the substrates, which are later plugged. The electrolyte is solidified by cooling or polymerization of a monomeric component present in the formulation. The edge busbars are 712 and 711, to which the electrical connections are made. The perimeter sealant is shown as 705. These busbars are only shown along one edge, but they may also be placed around the complete perimeter. These busbars may be covered by the sealants in the encapsulated device during lamination. When conductive tapes are used as these busbars, they may extend past the substrate edge to which electrical connections could be made, or these busbars could be folded and bonded to the outside of the substrate to which the connectors could be clamped to or the windows can be slid into spring sockets so as to make connections to these.

FIG. 7a shows an isometric exploded view of the type of an electrochromic device shown in FIG. 6 formed using the current invention. Substrates 701 and 704 are coated with electrically conductive coatings (also called conductive substrates). These conductive coatings are not shown to reduce the complexity in the diagram, but they extend to the edge of the substrate and the busbars 712 and 711 make direct contact with these conductive layers which are transparent for windows. The view shows the EC layer 710 and the counterelectrode 709 deposited in the central area of the two conductive substrates. The electrolyte layer and the primary sealant are formed by additive printing and these layers are shown as 703 and 705. These two materials would be deposited on substrate 701, where 703 would cover most of the EC coating 710 leaving a border around the perimeter which may be a few mm to a few cm wide (the width will be larger for large area devices). FIG. 7b shows the same device after lamination shown as a section taken along the dotted lines of FIG. 7a. The numbering of the components is the same in both. The busbars 711 and 712 are shown as tapes, (e.g., Z-axis conducting tapes) but these busbars may also be printed (frits and conductive adhesives) and extended to the edges to the sides and then to the back of the substrates to make external electrical connections. The tapes may be folded over the sides and then to the back of the substrates (and may also be bonded to the substrates) for external connectors. In another embodiment (not shown), thin metallic foils (such as nickel foils, 10 to 100 µm in thickness coated with tin or silver) may be used as connectors where one end of these are bonded to the frit or conductive adhesive busbars and embedded within the laminate and the other end sticks out of the laminate to connect the wires to at a later stage. In a variation once the electrolyte layer is deposited, the counterelectrode 709 may be deposited on this layer, i.e., the substrate 704 need not be pre-coated with 709.

FIG. 8a shows an isometric exploded view of an electrochromic device formed using the current invention and is quite similar to the device shown in FIG. 7a, except for the busbar configuration as discussed below. This device is similar in construction to the one shown in FIG. 6. Substrates 801 and 804 are coated with electrically conductive coatings (also called conductive substrates). These conductive coatings are not shown to reduce the complexity in the diagram, but they extend to the edge of the substrate and the busbars 812a, 812b, 811a and 811b make direct contact with these conductive layers which are transparent for windows. 812a and 812b make contact with the same conductive coating on substrate 801 and 811a and 811b make contact with the same conductive coating on substrate 804. The view shows the EC layer 810 and the counterelectrode 809 deposited in the central area of the two conductive substrates. The electrolyte layer and the primary sealant are formed by additive printing and these layers are shown as 803 and 805. These materials would be deposited on substrate 801, where 803 would cover most of the EC coating 810 leaving a border around the perimeter as explained in the previous figure. FIG. 8b shows the same device after lamination shown as a section taken along the dotted lines of FIG. 8a. The numbering of the components is the same in both. The busbars 811a and 811b and also 812a and 812b are shown as tapes, (e.g., Z-axis conducting tapes) but these busbars may also be printed and extended to the edges to the sides and then to the back of the substrates to make external electrical connections. The tapes may be folded over the sides and back of the substrates (and may also be bonded to the substrates) for external connectors. The tapes are shown as extending from the opposite edges of the device. This is not necessary and all four may extend from the same device edge. Busbars 812a and 812b may be connected together externally and also the same could be done for 811a and 811b. In some aspects, printed busbars and connectors described in reference to FIGS. 7a-7b may also be used.

Although FIGS. 7a, 7b, 8a, 8b do not show the secondary sealants, it is to be understood that the secondary sealants may be used as illustrated above (e.g. see FIGS. 4a-4c).

Thermoplastic preformed films for mechanical protection discussed earlier are generally in a thickness of about 0.7 to 2 mm and are commercially available and are made out of materials such as polyvinylbutyral (PVB) which are generally a terpolymer of vinyl butyral, vinyl alcohol and vinyl acetate; thermoplastic urethane (TPU) and, ionomers and ethyl vinyl acetate (EVA). Some of the manufacturers of PVB films for protective lamination are Eastman (Kingsport, TN), Sekisui (Winchester, KY) and Kuraray USA (Houston, TX).

One way to fabricate protected variable transmission device laminates is as follows: taking a first substrate (which may be coated for an EC device or a liquid crystal device, but not coated for a thermochromic device), and on its first surface printing the interlayer material. This may be a variable transmission medium or an electrolyte for an EC device. For a variable transmission device, optionally a barrier sealant may also be printed similarly on the same surface, and near the perimeter of the substrate while the variable transmission composition or the electrolyte interlayer is printed in the inner region of the substrate. Barrier sealant is also called a primary sealant which protects the electrolyte from outside moisture and air by forming a barrier, and also does not allow any electrolytic components to pass through. A second substrate is then placed on the printed material so that is first surface touches the interlayer and/or the sealant material depending on their thickness. The first surface of the second substrate may also be coated when fabricating an EC or a liquid crystal device, that is the coated side faces the printed material. The busbars and connectors may also be integrated with the variable transmission device as described numerous times in this disclosure. The protective thermoplastic film is placed on the second surface of the second substrate followed by placing the third substrate on top of the film. This sandwich now has three substrates and sandwiching the barrier sealant and the electrolytic interlayer material between the first and the second substrates and the protective thermoplastic interlayer between the substrates two and three. This assembly is then evacuated to remove any gases or moisture, and then heat and pressure is applied. The heating is done to a temperature where the printed interlayer can flow and form a contiguous uniform and clear sheet while also having the barrier sealant and the protective interlayer also flow and result in uniform contiguous components. Upon cooling, a bubble-free laminated device is formed which is transparent (free of optical haze) which is sealed by the primary seal. An additional sealent (secondary sealant) may also be placed further circling the barrier sealant. In another embodiment, the protective thermoplastic may also be printed on the second surface of the second substrate. In a further embodiment the thermoplastic sealent for the variable transmission part of the device and/or for the protective cover may also crosslink by continued application of pressure and/or heat during the lamination, or in post-processing by radiation or by moisture curing (room temperature vulcanizing materials-RTVs). If another barrier sealant is needed to protect the protective interlayer from moisture, then using similar principles of primary and the secondary sealants discussed above may be employed.

As discussed above, FIGS. 9a-9b show a laminate formed using three substrates (902, 904, 905), a printed electrolytic interlayer (903) and a film interlayer (906). Any coatings, sealants, busbar or connectors (for variable transmission devices if required) are not shown. For example, depending on the type of the EC device selected, the printed interlayer (903) may be only an ion conducting electrolyte or an electrolyte with an electrochromic dye. In one EC device construction the electrolyte is also the EC layer which contacts transparent conductive coatings (TCs) on both substrates. Detailed construction of such EC devices and electrolytic compositions see published U.S. patent application Ser. No. 20/220,155648 and 20190235339, the contents of which are included herein by reference. In FIG. 9a, the first substrate is shown as 902, where a pattern of a thermoplastic material 903 is printed on its first surface. For an EC device, there may also be printed sealant near the perimeter as shown in FIGS. 5a, 7a and 8a along with busbars, coatings, etc., but those elements and TCs are not shown in FIG. 9a to explain the use of the three substrate laminate clearly. Also shown in FIG. 9a is the second substrate as 904, and a protective film such as PVB, EVA, ionomer or TPU, etc. as discussed earlier which is placed on the second surface of the second substrate and is shown as 906. The first surface of the second substrate is touching the printed interlayer that was deposited on the first surface of the first substrate 902. In general, the surface of the protective film is textured to allow the air and moisture to escape under vacuum. A third substrate 905 is placed on top of the film (906) to form a subassembly, where its first surface touches the film. The subassembly is laminated in one process by placing this in a diaphragm laminator, autoclave, nip rolls or any other type of lamination equipment. In general, the assembly is subjected to vacuum to remove all of the entrapped gasses or moisture, and then it is heated while the pressure is applied so that the thermoplastic interlayer materials flow and form a contiguous layer. The heat and pressure may be applied simultaneously or in any process profile and sequence which is suitable. The assembled clear laminate is shown in FIG. 9b, and the various elements are numbered in the same way as in FIG. 9a. The laminate is cooled and if this is an EC device or any other variable transmission device, it may then be used as is, where the substrate 905 faces the sun in a desired window application such as in a building or transportation. If this panel is used in a window application, where an IGU is fabricated, then this laminated panel is assembled with yet another substrate (fourth substrate) coated with a low emissivity coating and is assembled in a parallel relationship to this laminate, and providing a gap between the fourth and the first substrate which is enclosed by a perimeter spacer and a sealant. This gap is filled with a gas such as air, argon, mixtures, etc. In other words, the IGU configuration has the low-e coated substrate is placed facing the bottom surface of the laminate indicated by 907 in FIG. 9b (not shown). The low-e coating on the fourth substrate may face the gap or outside of the gap. In another configuration there may even be a low-e coating on surface 907, and then its presence is optional if the fourth substrate used to form the IGU. In some windows whether an IGU is formed or not there may be optional coatings on substrate 3. For example, a first surface of the substrate facing the laminate may have a coating or a stack of coatings that reflect light (e.g., see U.S. Pat. No. 11,287,717 on more details of increasing reflectivity and/or imparting color. In addition, there may be coatings on a second surface of the third substrate 905 that face outside and provide self-cleaning properties by their photoactivity (such as those comprising titanium oxide), for example sec U.S. Pat. No. 6,884,752.

Busbars mainly comprise metal conductors with low electrical resistance, such as conductive metal tapes, conductive metal containing frits (e.g., silver frits) and conductive adhesives (e.g., silver filled epoxies) with a surface conductivity of about 100 times or more as compared to the transparent conductors used. Typically, the surface resistance of the transparent conductors is in the range of about 1 to 50 ohms/square, and these busbars are in the range of about 0.00001 to 0.01 ohms/square to ensure minimum potential drop in them as they carry the current to the device. In order to assemble the device shown in FIG. 3 or 4a-4c, prior to lamination, busbars are placed on the perimeter of the substrates as discussed earlier. Examples of metallic tapes such as type 3007 and 3011 from 3M Company located in St. Paul, MN).

The busbars may also be deposited by 3d printing or other printing methods, these include forming of busbars and connector pads on the substrate. These busbars may be formed using conducting adhesives (e.g., adhesives such as epoxies containing conductive metal particles (including nanoparticles) and ceramic frits (e.g., see Raj et al, Johnson Matthey Technol. Rev., 2017, 61, (2), 156), or metal particles or metal nanoparticles with binders and/or solvents where the binders and solvents are removed by heating the printed patterns and the metal particles fuse to give highly conductive paths (see for example, see U.S. Pat. No. 8,693, 079). However, when busbars are printed then it is preferred that this be done prior to the deposition of any redox layers, or the electrolytes and sealants so that heat treatments to bring the busbars to the final format are not limited by the presence of any of these coatings and materials.

Fabrication of a Substrate Comprising a Thermoplastic Film Having a Predetermined Thickness and/or Shape In certain embodiments, the present disclosure is directed to a method of making a laminate comprising a polymeric thermoplastic film deposited on a surface of a substrate (e.g., substrate 102 of FIG. 1*a*). Specifically, the method comprises depositing a pattern of molten polymeric thermoplastic composition (e.g., thermoplastic material 103 of FIG. 1*a*) on a surface of the substrate. The methods described herein or other methods known in the art (e.g., fused filament fabrication (FFF) or thermoplastic pellet micro-extrusion) can be used to deposit the molten polymeric thermoplastic composition onto the substrate. In certain embodiments, the polymeric thermoplastic composition is deposited onto the surface of the substrate in one or more layers and/or over one or more regions. In some embodiments, the layers can be stacked upon on another while, in other embodiments, the layers are deposited onto different areas/regions of the substrate. While the polymeric thermoplastic compositions used may be the same in all layers, in certain instances, one or more of the compositions used may be different from the other polymeric thermoplastic compositions used on the substrate. The applicator/operator will select the compositions that will be used based on desired properties (e.g., mechanical properties, optical properties) and the final use of the laminate.

The molten polymeric thermoplastic composition is then cooled below its melting point. After the thermoplastic composition is cooled, a release barrier is placed on/pressed against a surface of the cooled polymeric thermoplastic composition thereby forming a subassembly. The release barrier can be made from any material provided the material has a melting point higher than melting point of the polymeric thermoplastic composition and further provided that the release barrier can release the cooled polymeric thermoplastic composition (e.g., not stick to or has no or low adhesion to the cooled polymeric thermoplastic composition). For example, in certain embodiments, the release barrier is made from polyethylene terephthalate (PET), metal, or a metal coated with a coating such as polytetrafluoroethylene. In certain embodiments, a release agent can be applied onto the surface of the barrier layer that contacts the polymeric thermoplastic composition in order to aid the release of the release barrier. The barrier layer may be a flexible film which is easy to remove by peeling after the formation of the laminate structure as discussed below. Additionally, the release barrier can be placed onto the surface of the cooled polymeric thermoplastic composition by any means including, without limitation, an applicator (i.e., individual) physically placing the barrier on the composition or a machine (which may or may not be automated) placing the barrier onto the composition. After the release barrier has been placed on the surface of the cooled polymeric thermoplastic composition, the subassembly is heated above the melting point of the polymeric thermoplastic composition. Pressured is applied to the subassembly either during heating or after the polymeric melting point of the polymeric thermoplastic composition has been reached in order to force the polymeric thermoplastic composition to flow and form an interlayer between the substrate and the release barrier having a predetermined thickness/thickness geometry. The interlayer can either have a substantially uniform thickness or a substantially non-uniform thickness. The applicator/operator will determine the ideal thickness of the thermoplastic film based on properties that the applicator/operator desires to achieve. A discussion regarding the methods used to apply heat and pressure is not necessary since those methods are well known in the art. After the application of heat and pressure, a laminate is formed wherein the laminate comprises the substrate, the polymeric thermoplastic composition having the desired predetermined thickness, and the release barrier. In order to remove the release barrier from the laminate structure, the laminate is cooled below the melting point of the polymeric thermoplastic composition. Removal of the release barrier can be conducted by any means including, without limitation, an applicator (i.e., individual) physically removing the barrier from the laminate or a machine (which may or may not be automated) removing the barrier from the laminate. After the release barrier is removed from the laminate, what remains is a substrate comprising a thermoplastic film having a predetermined thickness. That substrate can then be applied to other substrates/materials to form a final product or article.

While the substrate may have a planar geometry (e.g., a piece of glass or plastic that is substantially flat), in some embodiments the substrate may comprise non-planar geometry (e.g., curved edges on a piece of glass or plastic that is substantially flat or a substantially curved piece of glass or plastic). As exemplified above, the substrate is manufactured from glass or plastic. However, the substrate can be manufactured from any type of material including, without limitation, metal, ceramic, wood, composite, or combinations thereof. In some embodiments, the substrate can be substantially rigid while in other embodiments it can be substantially flexible.

In another embodiment substrate 102 (FIG. 1*a*) is coated with a release material or a release film or any other release layer is placed prior to the deposition of the 3d printed material. Once the printed material is cooled, another release layer (or a release barrier as described above) is placed on top of the printed material. This means that as shown in FIG. 1*b*, faces of the substrate 102 and 104 touching the printed material 103 have no or low adhesion to the printed material. The low adhesion may be achieved by the properties of the materials used for 102 and 104, or placing additional films or elements, or even depositing (e.g. spraying) a material that results in release properties. Once the laminate is formed (FIG. 1*c*) both the substrates are removed and the formed film 103 is isolated. As discussed earlier, if these thermoplastic compositions have further polymerizable groups (e.g., acrylate groups along with initiators), then these may be crosslinked post lamination. This method may be used to form planar films or non-planer sheet objects. Film 103 may be flexible or a rigid shaped object. Substrate 102 may also be one half of a mold and substrate 103 the second half of a mold, i.e., the mold is opened, and the printed material is deposited on the surface of the opened mold as discussed earlier, and then the mold is closed and the material is heated under pressure and subsequently cooled and then the formed shape of the polymeric part is released (or ejected from the mold). In this fashion large parts may be made using low pressure (i.e., applied under heat then cooled under pressure as mentioned above), where the pressure ranges from 12 (0.083 MPa) to 250 psi (1.72 MPa) (area based on the part size) as compared to injection molding where higher pressure in the range of about 2 to 8 tons/square inch (28 to 110 MPa) may be required. In other words this innovation describes molding a material, where the material is deposited in an open mold using 3d printing as one or multiple layers, and then closing the mold and forming the part under heat and pressure, and opening the mold after the part is cooled to below its melting point. In one aspect, patterns of more than one material are deposited into the open mold (side by side format, or in a format on top of each other, or in a mixed format) and then these materials are integrated after the mold closes and heat and pressure are applied, so that when the part is removed from the mold upon completion of the process, the different materials form a single part.

In another aspect, the material is deposited with a texture (e.g., see FIGS. 1a-1c and 5a), and when the mold is opened after the process cycle completion, this texture is not present or a different surface texture is imparted which is embossed by the mold (meaning collectively that a different surface texture is imparted as compared to the starting texture). In another variation, the bottom half of the mold is rigid (e.g., made out of a metal or a resin), and the top part is a flexible diaphragm which is pressurized from the side which is not in contact with the polymeric material being molded. In another embodiment thermoset compositions (prior to curing or uncured material) or their composites (containing other materials or reinforcing materials such as particles and fibers of glass, carbon and other inorganic materials) may also be deposited into open molds, which are then optionally cured (crosslinked) into a final form by applying heat and pressure in a closed mold, or after post-molding operation as taught above.

EXAMPLES

Example 1 Lamination of 3d Printed Layer of Thermoplastic Polyurethane

A 7.5 cm×7.5 cm standard soda-lime glass substrate with a thickness of 3.2 mm was used as the printing bed/substrate. Haze of this substrate prior to lamination was measured using Ultrascan XE instrument (made by Hunter Lab, Reston, VA) and was found to be 0.19%. A transmission spectra of this substrate prior to lamination is shown in FIG. 11. This spectra was measured using UV3100 instrument using a MPC 3100 chamber made by Shimadzu Scientific (located in Columbia, MD). As seen the transmission at 550 nm was 90.1%. All haze and transmission measurements in this disclosure were made using these instruments. Iroprint F80112 thermoplastic polyurethane with a filament diameter of 1.75 mm was supplied by Huntsman Corporation (Woodlands, TX). This material was printed using a "i3 MK3S" Fused Filament Deposition 3d printer (made by Prusa, Czech Republic) with a 0.4 mm nozzle. The layer was made by printing several straight parallel lines deposited next to each other in one continuous path on the bed/substrate. The bead is continuous, and the path direction is simply turned by 180 degrees at the end of the line and displaced by a set amount with no intentional overlap of the printed lines.

Taking most of the standard parameters in the slicing software "Prusa Slicer" for this material and changing only the following settings:

|  |  |
| --- | --- |
| Layer height | 0.25 mm |
| Extrusion width | 0.45 mm |
| Perimeters | 0 |
| Fill density | 100% |
| First layer speed | 20 mm/s |
| Infill speed | 80 mm/s |
| Top solid infill | 40 mm/s |
| Infill pattern | Rectilinear |
| Fill angle | 90° |
| Extrusion multiplier | 1.8 |
| Extruder temperature | 232° C. |
| Bed temperature | 70° C. |

-continued

|  |  |
| --- | --- |
| Retraction length | 0.4 mm |
| Fan | Always on |
| Fan speed | 100% |

Custom G-code was added to accommodate the thickness of the glass substrate replacing the original detachable printing bed from the printer. Distance between nozzle and substrate determined in "Live adjust Z" to −1.048. No intentional overlap of beads was used.

Figure 10B:
FIGS. 10a and 10b are images of a printed pattern formed by printing a thermoplastic polymer using a 3d printer on a glass substrate and then the laminate formed using another glass substrate.
Figure 10A:
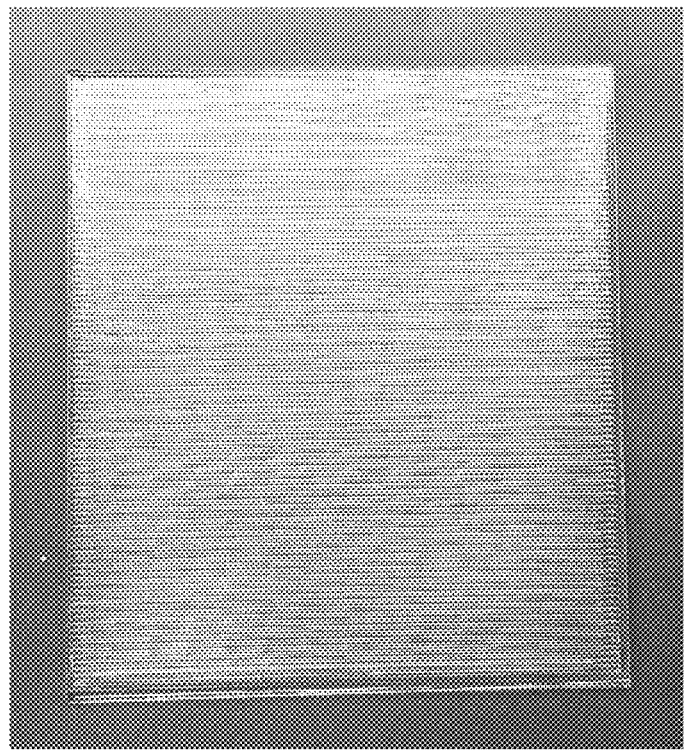

The final thickness of the layer measured on the substrate was 0.224 mm as printed. The texture of the print made the film opaque and hazy. An image of the printed pattern on the glass substrate is shown in FIG. 10a. The haze value of this pattern on the substrate was 28.9% (measured using Ultrascan XE). A second piece of glass of the same dimensions as the substrate for printing bed was placed over the first substrate containing the printed layer (interlayer). This stack was laminated in a double chamber vacuum laminator "SPL2828" (Bent River, Cottonwood, AZ) at 180° C. with a pressure of 13.5 psi and a soaking time of 30 min.

After lamination, the laminate was clear, haze and bubble free. An image of this laminate is shown in FIG. 10b. The texture of the print could no longer be distinguishable. The haze of this laminate as measured as above was 0.28% and transmission at 550 nm was 89.0%. A transmission spectrum of this is shown in FIG. 11 (labelled as "Single Layer"). Final thickness of laminate measured at 5 points give uniformity in thickness with an average of 6.58 mm. After subtracting the substrate thickness, the final thickness of the printed interlayer of TPU after lamination was determined to be 0.18 mm.

Example 2 Lamination of an Interlayer Formed by Printing of Several Printed Layers of Thermoplastic Polyurethane A 7.5 cm×7.5 cm soda-lime glass substrate in a thickness of 3.2 mm was used as the printing bed/substrate as in Example 1. Iroprint F80112 thermoplastic polyurethane with a filament diameter of 1.75 mm supplied by Huntsman Corporation. This material was printed on the substrate using a "i3 MK3S" Fused Filament Deposition 3d printer with a 0.4 mm nozzle. Each layer was made by printing several straight parallel lines deposited next to each other in a continuous manner as in Example 1.

Taking most of the standard parameters in the slicing software "Prusa Slicer" for this material and changing only the following settings:

|  |  |
| --- | --- |
| Layer height | 0.25 mm |
| Extrusion width | 0.45 mm |
| Perimeters | 0 |
| Fill density | 100% |
| First layer speed | 20 mm/s |
| Infill speed | 80 mm/s |
| Top solid infill | 40 mm/s |
| Infill pattern | Rectilinear |
| Fill angle | 90° |
| Extrusion multiplier | 1.8 |
| Extruder temperature | 232° C. |
| Bed temperature | 70° C. |
| Retraction length | 0.4 mm |
| Fan | Always on |
| Fan speed | 100% |

Custom G-code was added to accommodate the thickness of the glass substrate replacing the original detachable printing bed from the printer. Distance between nozzle and substrate determined in "Live adjust Z" to −1.048. No intentional overlap of beads was used.

Figure 11B:
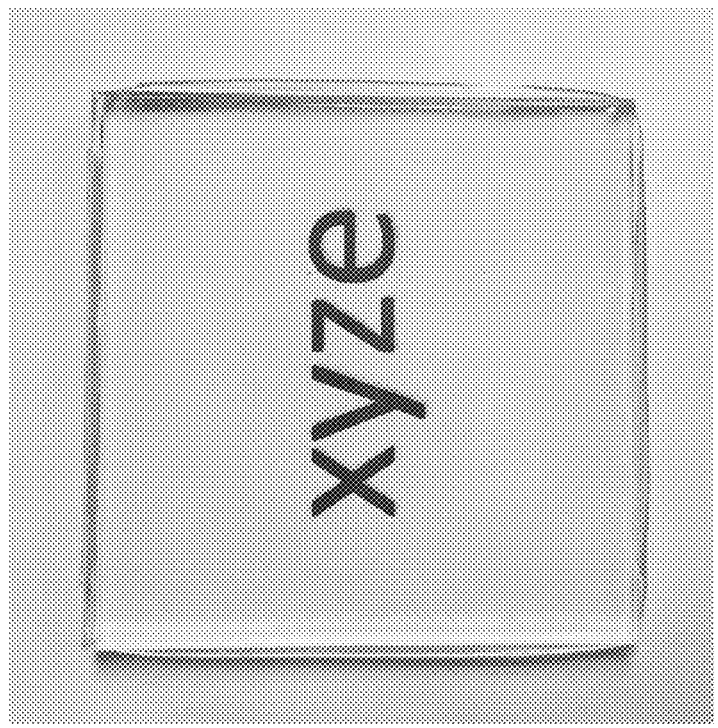
FIGS. 11a and 11b are images of a printed pattern formed by printing a thermoplastic polymer using a 3d printer on a glass substrate and then the laminate formed using another glass substrate.
Figure 11A:
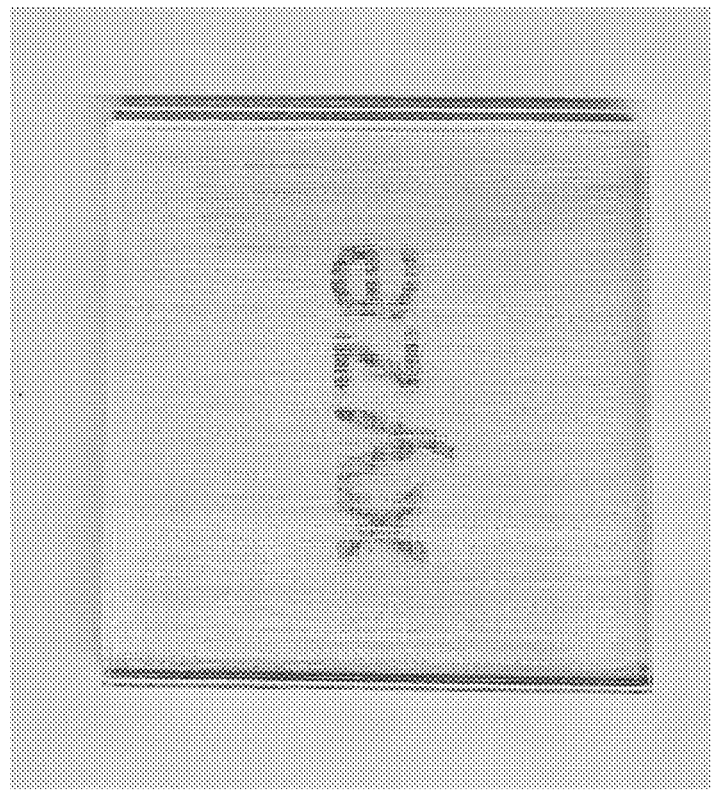

Three layers were printed, where each subsequent layer was deposited on top of the previous layer. Each layer was deposited by extruding the bead so that the lines were formed in a direction which was at 90 degrees to the lines in the previous layer. The final thickness of the as-deposited trilayer was measured to be 0.741 mm. The texture of the print and interference of several layers made the film very opaque and hazy. An image of this printed pattern is shown in FIG. 11a, the letters "XYZE" are printed on a paper placed below the laminate.

Figure 12:
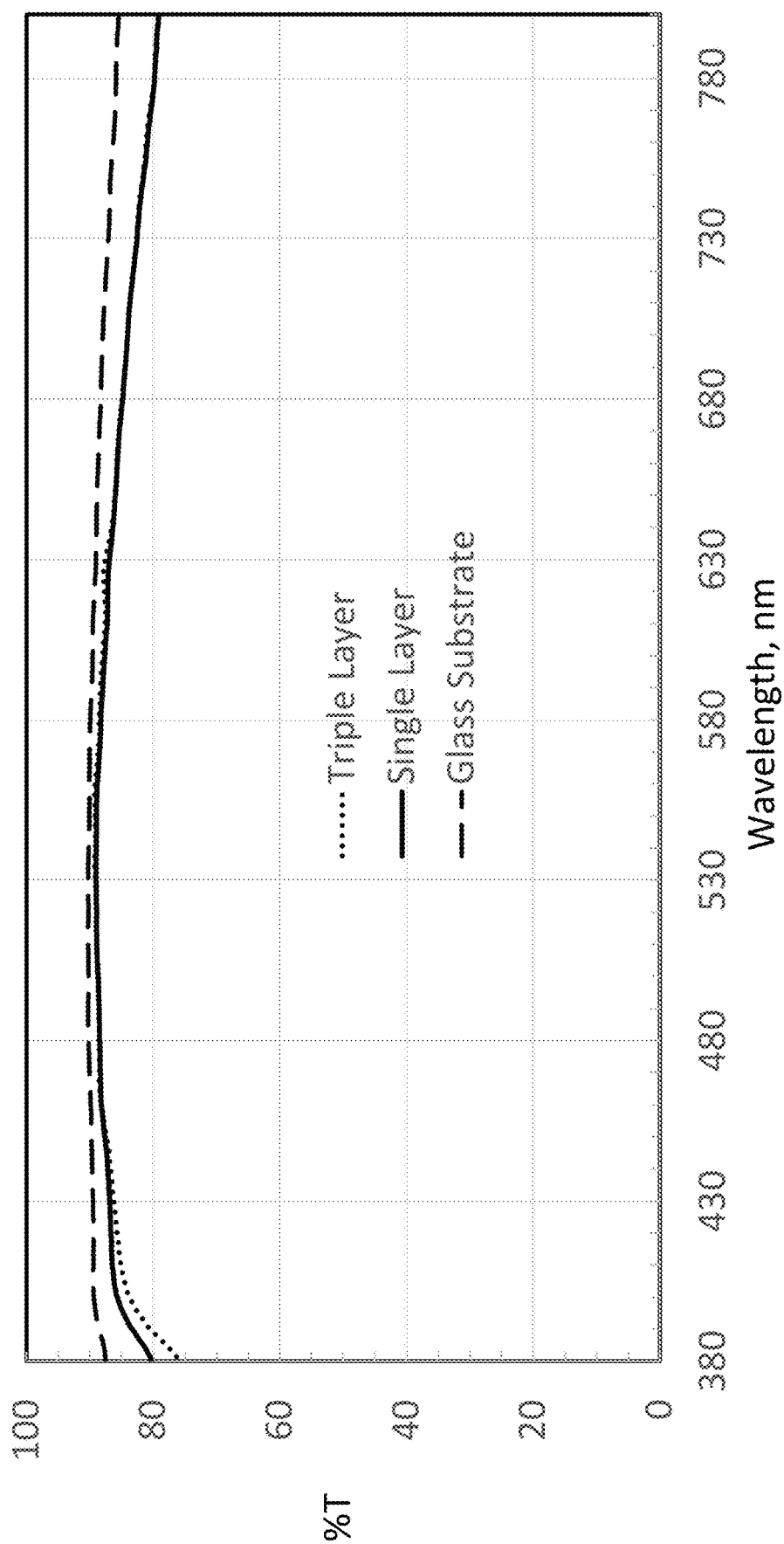
FIG. 12 shows transmission spectra of a glass substrate, a single layer laminate, and a triple layer laminate of Examples 1 and 2.

A second piece of glass of the same dimensions was placed over the first substrate containing the printed tri-layer (interlayer). This stack was laminated in a double chamber vacuum laminator "SPL2828" at 180° C. with a pressure of 13.5 psi and a soaking time of 30 min. After lamination, the laminate was clear, haze and bubble free. The texture of the print could no longer be distinguishable. Image of the laminate is shown in FIG. 11b. The transmission of this laminate at 550 nm was 89.2% and haze was 0.31%. A transmission spectrum of this is shown in FIG. 12 (labelled as "Triple Layer"). Final average thickness of laminate measured at 5 points was 6.846 mm. The final thickness of the printed interlayer of TPU after lamination after subtracting the substrate thickness was estimated at 0.446 mm.

While aspects of the subject matter of the present disclosure may be embodied in a variety of forms, the following description is merely intended to disclose some of these forms as specific examples of the subject matter encompassed by the present disclosure. Accordingly, the subject matter of this disclosure is not intended to be limited to the forms or embodiments so described.

The singular forms "a," "an," and "the" include plural referents unless the context clearly dictates otherwise.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. Furthermore, such an interpretation should apply regardless of the breadth of the range or the characteristics being described. Additionally, it is noted that all percentages are in weight, unless specified otherwise.

In understanding the scope of the present disclosure, the terms "including" or "comprising" and their derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps. It is understood that reference to any one of these transition terms (i.e. "comprising," "consisting," or "consisting essentially") provides direct support for replacement to any of the other transition term not specifically used. For example, amending a term from "comprising" to "consisting essentially of" would find direct support due to this definition.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. For example, in one aspect, the degree of flexibility can be within about ±10% of the numerical value. In another aspect, the degree of flexibility can be within about ±5% of the numerical value. In a further aspect, the degree of flexibility can be within about ±2%, ±1%, or ±0.05%, of the numerical value.

Generally, herein, the term "or" includes "and/or."

As used herein, a plurality of compounds or steps may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, certain compositions, injuries or conditions, steps, or the like may be discussed in the context of one specific embodiment or aspect. It is understood that this is merely for convenience, and such disclosure is equally applicable to other embodiments and aspects found herein.

The invention claimed is:

1. A method of making an electrochromic (EC) laminate device comprising a first interlayer sandwiched between a first substrate having first and second surfaces, and a second substrate having first and second surfaces, wherein the first surfaces of the first and second substrates are coated; and further comprising a second interlayer sandwiched between the second substrate and a third substrate, wherein the method comprises:
   (a) depositing a pattern of a molten electrolytic thermoplastic composition on the first surface of the first substrate to form the first interlayer, wherein the pattern comprises at least one of lines and beads;
   (b) contacting the first surface of the second substrate with the pattern;
   (c) placing a film of a thermoplastic polymer to form the second interlayer on the second surface of the second substrate followed by placing of the third substrate on the film to form a subassembly;
   (d) applying vacuum to the subassembly and heating the subassembly and applying pressure thereto; and
   (e) forcing the thermoplastic composition and the second interlayer to flow to form a laminated device.

2. The method of claim 1, wherein the second interlayer forms a protective layer.

3. The method of claim 2, wherein the protective layer protects the underlying EC laminate device from at least one of mechanical damage and solar radiation damage.

4. The method of claim 3, wherein the protective layer comprises a composition selected from polyvinylbutyral, thermoplastic urethane, ionomer, or polyethylvinylacetate.

5. A method of forming an insulated glass unit by combining the EC laminate device formed by the method of claim 3 in a parallel configuration with a substrate coated with a low-e coating and assembling the EC laminate device and the substrate coated with a low-e coating with a gap therebetween.

6. A method of making an electrochromic (EC) laminate device comprising an electrolytic interlayer and a sealant sandwiched between a first substrate having first and second surfaces, and a second substrate having first and second surfaces, wherein the first surfaces of the first and second substrates are coated; wherein the method comprises:

(a) depositing patterns of two different thermoplastic compositions on the first surface of the first substrate, wherein the sealant composition is deposited close to the substrate perimeter, and an electrolytic composition inside the sealant perimeter wherein the patterns comprise at least one of lines and beads;

(b) contacting the first surface of the second substrate with the pattern to form a subassembly;

(c) applying vacuum to the subassembly and heating the subassembly and applying pressure; and (d) forcing the electrolytic composition to flow to form the electrolytic interlayer and the sealant composition to flow to form a barrier encircling the electrolytic interlayer.

7. The method of claim 6, further comprising converting the thermoplastic sealant into a crosslinked thermosetting material during one or more of steps a)-d) or after step d).

8. The method of claim 6, further comprising providing a busbar and at least one electrochromic dye in the electrolytic composition.

* * * * *